(12) United States Patent
Curry

(10) Patent No.: US 10,999,962 B2
(45) Date of Patent: *May 11, 2021

(54) ASYMMETRIC TEREBRATING DIGGING TOOL WITH LATERAL DISPLACEMENT SLIDE SURFACE AND PIVOTING LEG

(71) Applicant: Jon K Curry, Chino Valley, AZ (US)

(72) Inventor: Jon K Curry, Chino Valley, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/735,957

(22) Filed: Jan. 7, 2020

(65) Prior Publication Data
US 2020/0137939 A1    May 7, 2020

Related U.S. Application Data

(63) Continuation-in-part of application No. 14/545,101, filed on Mar. 26, 2015, now Pat. No. 10,542,652, which is a continuation-in-part of application No. 13/987,636, filed on Aug. 16, 2013, now abandoned.

(60) Provisional application No. 61/957,915, filed on Jul. 15, 2013.

(51) Int. Cl.
| *A01B 1/02* | (2006.01) |
| *A01C 5/02* | (2006.01) |
| *A01B 1/16* | (2006.01) |

(52) U.S. Cl.
CPC .................. *A01B 1/02* (2013.01); *A01B 1/16* (2013.01); *A01C 5/02* (2013.01)

(58) Field of Classification Search
CPC .... A01B 1/00; A01B 1/08; A01B 1/22; A01B 1/18; A01B 1/16; A01B 1/10; A01B 1/06; A01B 1/02; A01B 1/022; A01B 1/024; A01B 1/026; A01B 1/028; A01C 5/02

See application file for complete search history.

(56) References Cited

U.S. PATENT DOCUMENTS

| 529,562 | A | * | 11/1894 | Mortenson | A01B 1/06 172/372 |
| 630,535 | A | * | 8/1899 | Goble | A01B 1/16 7/114 |
| 1,053,005 | A | | 2/1913 | Brown | |
| 1,056,614 | A | * | 3/1913 | Weikert | A01B 1/16 294/50.6 |
| 1,101,713 | A | | 6/1914 | Putnam | |
| 1,364,140 | A | * | 1/1921 | Persson | A01B 1/06 172/375 |
| 1,437,199 | A | * | 11/1922 | Same | A01B 1/16 30/314 |
| 1,444,694 | A | * | 2/1923 | McGintie | A01B 1/16 254/132 |
| 1,546,463 | A | | 7/1925 | Ayres | |

(Continued)

*Primary Examiner* — Jessica H Lutz
(74) *Attorney, Agent, or Firm* — David Duckworth

(57) ABSTRACT

A dirt digging tool is provided which includes a handle and an asymmetrical head. The asymmetrical head include an upper end and a lower end which collectively form the tool's face. The lower end includes a ground engaging edge which includes a first convex arcuate edge which includes the tool's tip, a second convex arcuate edge, and a medial edge. The second convex arcuate edge is longitudinally spaced above the tip. Meanwhile, the medial edge is preferably straight and extends longitudinally, parallel to the handle, from the first convex arcuate edge's tip to the second convex arcuate edge.

4 Claims, 24 Drawing Sheets

(56) References Cited

U.S. PATENT DOCUMENTS

| | | | | |
|---|---|---|---|---|
| 1,554,518 A * | 9/1925 | Ostrander | A01B 1/16 254/132 |
| 1,652,478 A * | 12/1927 | Herman | A01G 20/30 294/55.5 |
| 1,706,658 A * | 3/1929 | Davis | A01B 1/06 172/380 |
| 1,751,481 A * | 3/1930 | La Tourrette | A01B 1/18 294/50.9 |
| 1,766,212 A * | 6/1930 | Bellah | A01B 1/06 172/16 |
| 1,867,086 A * | 7/1932 | Meixell | A01B 1/16 7/114 |
| 2,028,680 A * | 1/1936 | Mayeda et al. | A01B 1/18 294/50.8 |
| 2,049,713 A * | 8/1936 | Marshall | A01B 1/16 294/50.6 |
| D102,957 S * | 1/1937 | Renner | D8/9 |
| 2,116,852 A | 5/1938 | Stanford | |
| 2,121,265 A * | 6/1938 | Ruffcorn | A01B 1/16 254/132 |
| 2,137,458 A | 11/1938 | Phelps | |
| 2,229,434 A * | 1/1941 | Bailie | A01B 1/18 294/50.8 |
| 2,251,842 A | 8/1941 | Hill | |
| 2,266,677 A * | 12/1941 | Ing | A01B 1/06 172/378 |
| 2,317,801 A * | 4/1943 | Power | 294/50.6 |
| 2,349,621 A * | 5/1944 | Hardman | 254/132 |
| 2,419,719 A * | 4/1947 | Kennedy | 172/372 |
| 2,487,518 A * | 11/1949 | Brooke | A01B 1/16 294/49 |
| 2,507,948 A * | 5/1950 | Armstrong | A01B 1/16 294/50.6 |
| 2,594,598 A * | 4/1952 | Timmins | A01B 1/00 294/51 |
| 2,654,626 A * | 10/1953 | Rice | A01B 1/18 294/50.8 |
| 2,672,804 A * | 3/1954 | Kralovetz | A01B 1/06 172/373 |
| 2,685,734 A * | 8/1954 | Klein | A22B 5/206 30/144 |
| 2,727,777 A * | 12/1955 | Johnstone | A47G 21/023 294/26 |
| 2,843,359 A * | 7/1958 | Franz | A01B 1/16 254/132 |
| 2,964,773 A * | 12/1960 | Pence | A47J 43/288 15/245 |
| 3,234,720 A | 2/1966 | Blodgett | |
| 3,273,929 A * | 9/1966 | Shurtz | A01B 1/16 294/50 |
| 3,280,457 A * | 10/1966 | Lewis | A01B 1/16 30/317 |
| 3,805,386 A * | 4/1974 | de Mestral | A47J 17/02 30/278 |
| 3,885,307 A * | 5/1975 | Papalardo | A47J 17/02 30/123.5 |
| 4,147,329 A * | 4/1979 | Rodriguez | A01B 1/18 254/132 |
| D256,877 S * | 9/1980 | Liebling | D7/649 |
| 4,700,420 A | 10/1987 | Belanger | |
| 4,726,090 A | 2/1988 | Kilpatrick | |
| 4,736,928 A | 4/1988 | Smilkstein | |
| D319,952 S * | 9/1991 | Harvey, Sr. | D8/10 |
| 5,188,340 A * | 2/1993 | Green | A01B 1/16 172/21 |
| D376,518 S * | 12/1996 | Price | D8/11 |
| 6,536,118 B1 * | 3/2003 | Campbell | A47J 43/283 294/26 |
| D495,568 S * | 9/2004 | Register | D8/10 |
| D604,125 S * | 11/2009 | Griffith | D7/688 |
| 7,674,267 B2 * | 3/2010 | Lieberman | A61B 17/1671 606/79 |
| D643,264 S * | 8/2011 | Spiegel | D7/650 |
| D653,510 S * | 2/2012 | Huff | D8/10 |
| D674,258 S * | 1/2013 | Corzo | D8/45 |
| D691,866 S * | 10/2013 | Lee | D8/9 |
| D770,219 S * | 11/2016 | Yang | D7/349 |
| 2013/0081832 A1 * | 4/2013 | Spector | A01B 1/16 172/13 |
| 2015/0271979 A1 * | 10/2015 | Mutter | A01B 1/16 254/132 |
| 2018/0327988 A1 * | 11/2018 | Ziamandanis | E01H 5/02 |
| 2019/0014711 A1 * | 1/2019 | Shull | A01B 1/02 |
| 2019/0045697 A1 * | 2/2019 | Boies | B25G 1/04 |
| 2019/0261548 A1 * | 8/2019 | Flaatten | A01B 1/02 |

* cited by examiner

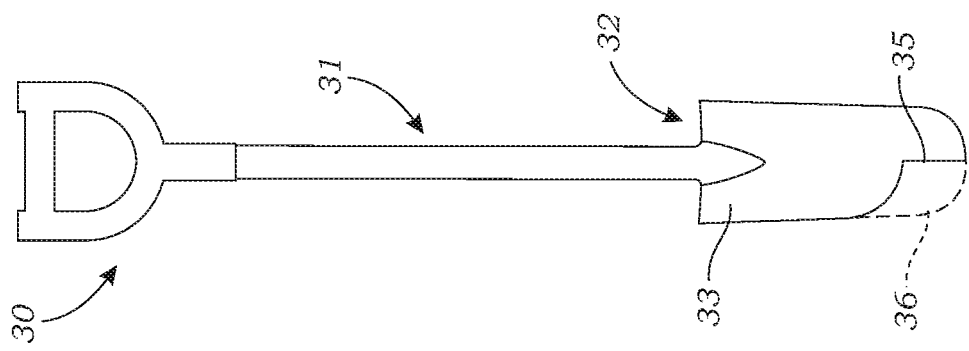
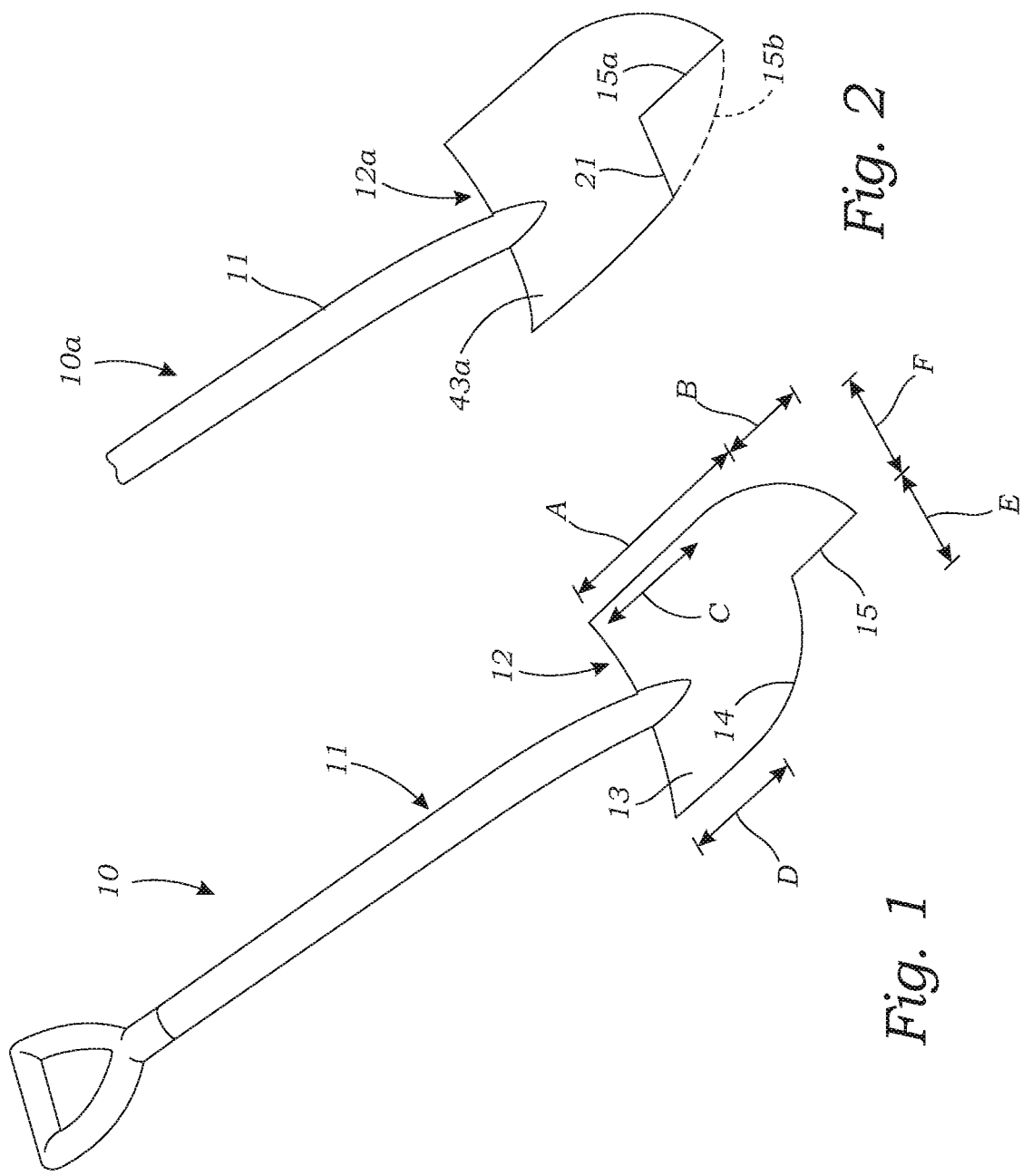
Fig. 1
Fig. 2
Fig. 3

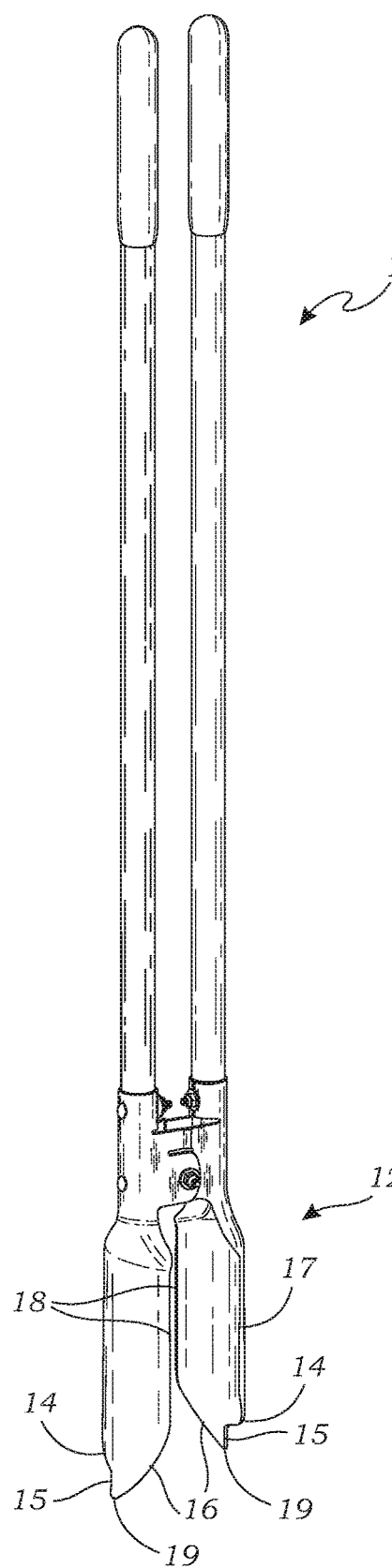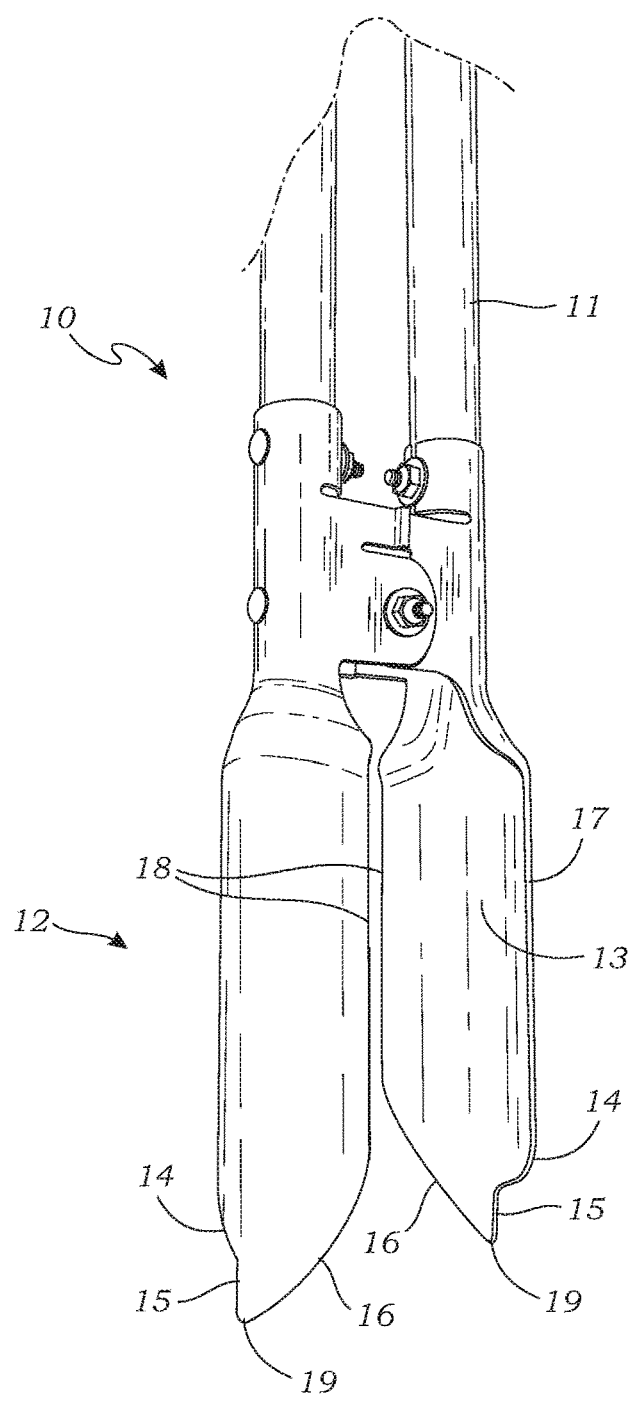
Fig. 36
Fig. 37

ASYMMETRIC TEREBRATING DIGGING TOOL WITH LATERAL DISPLACEMENT SLIDE SURFACE AND PIVOTING LEG

RELATED APPLICATIONS

The present application is a continuation-in-part application of pending U.S. patent application Ser. No. 14/545,101 filed Mar. 26, 2015, which in turn is a continuation-in-part application of U.S. patent application Ser. No. 13/987,636 filed Aug. 16, 2013, now abandoned, which in turn claims priority to expired U.S. Provisional Patent Application Ser. No. 61/998,908 filed Jul. 11, 2014, Ser. No. 61/967,836 filed Mar. 27, 2014, and Ser. No. 61/957,915 filed Jul. 15, 2013.

BACKGROUND OF THE INVENTION

This invention relates to tools.

A wide variety of tools have been developed. Those of skill in the art have for many years endeavored to produce improved tools which facilitate the completion of various tasks.

SUMMARY OF THE INVENTION

Briefly, in accordance with the invention, an improved digging tool to remove earth from around a generally cylindrically shaped root buried beneath the surface of the ground. The root has external side, top, and bottom surfaces. The digging tool comprises an elongate handle having a proximal end, a distal end and a longitudinal axis; and, an asymmetric head. The head includes an upper end connected to the distal end of the handle and having first and second peripheral side edges generally parallel to the longitudinal axis; includes a lower end spaced apart from the upper and the distal end of the handle, the lower end having a ground engaging edge; includes a face extending over the upper and lower ends; and, includes a tip shaped and dimensioned to penetrate earth. The lower end includes a first convex arcuate peripheral edge terminating at the tip and extending upwardly to the first peripheral side edge; includes a second convex arcuate peripheral edge spaced apart from the first arcuate peripheral edge, having an end point positioned above and spaced apart from the tip and below the upper end of the head, and extending upwardly from the end point to the second peripheral side edge; and, includes a substantially straight medial edge extending from the tip upwardly to the end point and generally parallel to the longitudinal axis. The ground engaging edge of the lower end collectively comprises the first and second arcuate peripheral edges and the substantially straight edge.

The digging tool is movable between at least three operative positions, a first operative rotation position with the tip contacting an external side surface of the root at a pivot point and the second arcuate peripheral edge spaced apart from the root; a second operative lever position with the handle generally vertically oriented, and with the second arcuate peripheral edge contacting the external top surface of the root and the straight edge contacting an external side surface of the root at a fulcrum point such that the tip is not positioned beneath the root; and, a third operative lever position with the handle canted away from vertical, and, with the second arcuate peripheral edge contacting the external top surface of the root and the straight edge contacting an eternal side surface of the root at a fulcrum point such that the tip is positioned beneath the root.

The digging tool is movable between at least three operative positions, a first operative rotation position with the tip contacting an external side surface of the root at a pivot point and the second arcuate peripheral edge spaced apart from the root; a second operative lever position with the handle generally vertically oriented, and with the second arcuate peripheral edge contacting the external top surface of the root and the straight edge contacting an external side surface of the root at a fulcrum point such that the tip is not positioned beneath the root; and, a third operative lever position with the handle canted away from vertical, and, with the second arcuate peripheral edge contacting the external top surface of the root and the straight edge contacting an external side surface of the root at a fulcrum point such that the tip is positioned beneath the root. The process also comprises the steps of displacing the head into the ground to the first operative position; tilting the handle to pivot the digging tool about the pivot point to loosen earth; displacing the head to the second operative position; tilting the handle to pivot the straight edge about the first fulcrum point; displacing the head to the third operative position; and, tilting the handle to pivot the straight edge about the second fulcrum point and move the tip to a point beneath the root.

In another embodiment of the invention, provided is a process to remove earth from the ground. The process comprises the step of providing a tool. The tool comprises an elongate handle having a proximal end, a distal end, and a longitudinal axis; and, an asymmetrical head. The head includes an upper end connected to the distal end of the handle and having first and second peripheral side edges generally parallel to the longitudinal axis; a lower end spaced apart from the upper end and the distal end of the handle, the lower end having a ground engaging edge; a face extending over the upper and lower ends; and, a tip shaped and dimensioned to penetrate earth. The lower end includes a first convex arcuate peripheral distal edge terminating at the tip and extending upwardly to the first peripheral side edge; a second convex arcuate peripheral proximal edge spaced apart from the first arcuate peripheral edge, having an end point spaced apart from and positioned above the tip and below the upper end of the head, and extending upwardly from the end point to the second peripheral side edge; and, a substantially straight medial edge extending from the tip upwardly to the end point and generally parallel to the longitudinal axis. The ground engaging edge of the lower end collectively comprises the first and second arcuate peripheral edges and the substantially straight edge. The process also includes the step of displacing the head into the ground to remove earth from the ground.

In still a further embodiment of the invention, provided is an improved digging tool. The digging tool comprises an elongate handle having a proximal end, a distal end, and a longitudinal axis; and, an asymmetrical head. The asymmetrical head includes an upper end connected to the distal end of the handle and having first and second peripheral side edges generally parallel to the longitudinal axis; a lower end spaced apart from the upper end and the distal end of the handle, the lower end having a ground engaging edge; and, a face extending over the upper and lower ends. The lower end includes a first convex arcuate peripheral distal edge terminating at the tip and extending upwardly to the first peripheral side edge; and, a second convex arcuate peripheral proximal edge. The arcuate proximal edge is spaced apart from the and positioned above the tip and below the upper end of the head; extends upwardly from the end point to the second peripheral side edge; and, is offset from the end point along the entire length of the proximal edge. The lower end also includes a substantially straight vertically oriented medial edge extending from the tip upwardly to the end point of the second convex arcuate proximal edge. The medial edge is preferably generally parallel to the digging tool's longitudinal axis.

In still another embodiment of the invention, provided is an improved process to remove earth from the ground. The process comprises the step of providing a tool. The tool comprises an elongate handle having a proximal end, a distal end, and a longitudinal axis; and, an asymmetrical head. The head includes an upper end connected to the distal end of the handle and having first and second peripheral side edges generally parallel to the longitudinal axis; and includes a lower end. The lower end is spaced apart from the upper end and the distal end of the handle, and has a ground engaging edge. The head also includes a face extending over the upper and lower ends; and, a tip shaped and dimensioned to penetrate earth. The lower end includes a first convex arcuate peripheral distal edge terminating at the tip and extending upwardly to the first peripheral side edge; and, a second convex arcuate peripheral proximal edge spaced apart from the first arcuate peripheral edge, having an end point spaced apart from and positioned above the tip and below the upper end of the head, and extending upwardly from the end point to the second peripheral side edge. The head also include a substantially straight medial edge extending from the tip from the tip upwardly to the end point. The ground engaging edge of the lower end collectively comprises the arcuate proximal edge, the medial edge, the arcuate distal edge, and the tip. The method also comprises the step of displacing the head tip into the ground to remove earth from the ground.

Accordingly, it would be highly desirable to provide an improved tool.

Therefore, it is a principal object of the instant invention to provide a new hand tool.

This and other, further and more specific objects and advantages of the invention will be apparent to those skilled in the art from the following detailed description thereof, taken in conjunction with the Drawings, in which:

DETAILED DESCRIPTION OF THE DRAWINGS

FIG. 1 is a perspective view illustrating a digging tool in the form of a shovel constructed in accordance with the principles of the invention;

FIG. 2 is a perspective view illustrating a digging tool in the form of a shovel constructed in accordance with an alternate embodiment of the invention;

FIG. 3 is a front view illustrating a digging tool in the form of a shovel constructed in accordance with another embodiment of the invention;

FIG. 36 is a perspective view of a post hole embodiment of the present invention;

FIG. 37 is a close-up perspective view illustrating the distal end of the post hole embodiment illustrated in FIG. 36;

DETAILED DESCRIPTION OF THE INVENTION

Turning now to the Drawings, which describe the presently preferred embodiments of the invention for the purpose of illustrating the practice thereof and not by way of limitation of the scope of the invention, and in which like characters refer to corresponding elements throughout the several views, FIGS. 1, 10 to 13 illustrate a digging tool 10 constructed in accordance with one embodiment of the invention.

Figure 11:
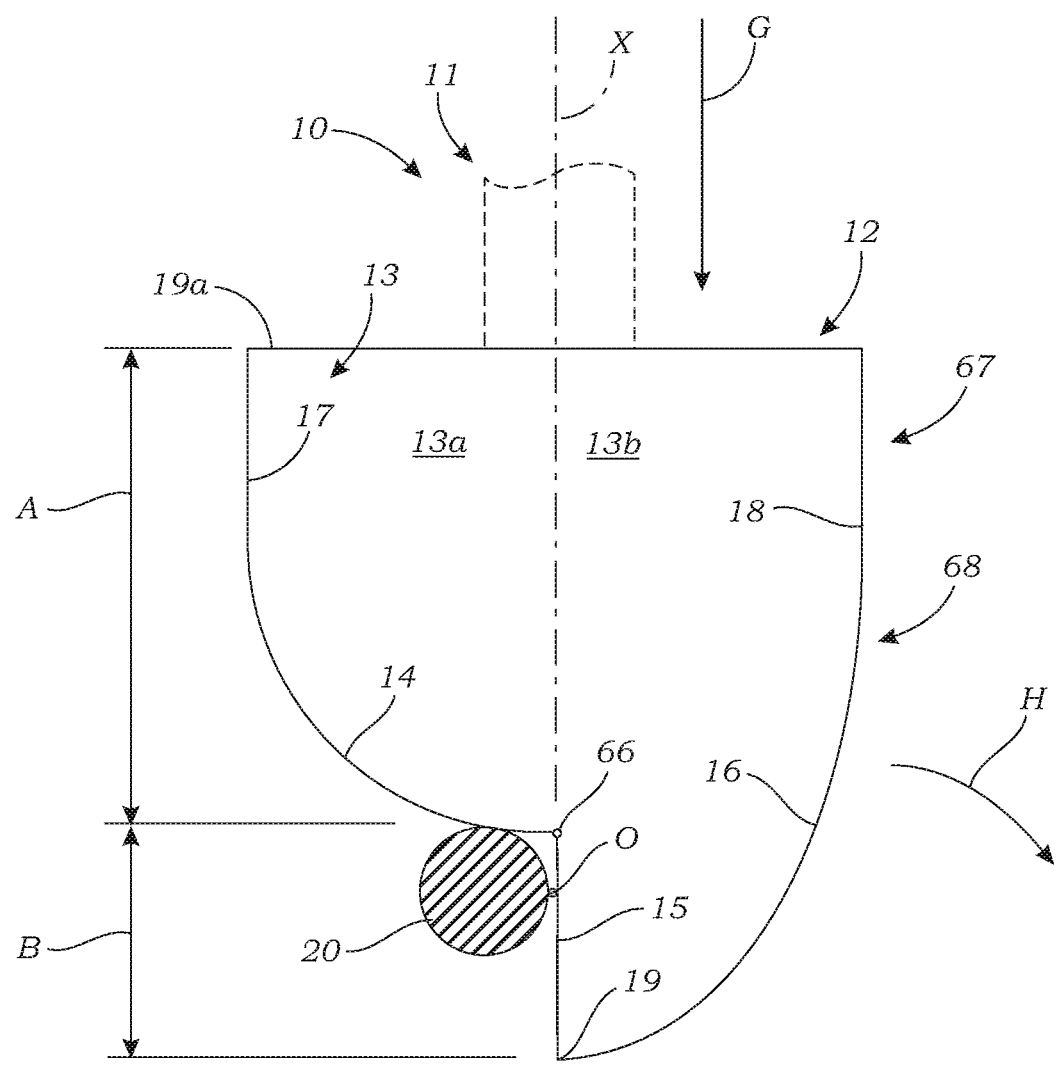
FIG. 11 is a front view further illustrating the mode of operation of the digging tool of FIG. 1.

The digging tool 10 comprises an elongate handle 11 having a proximal end, a distal end, and a longitudinal axis X (See FIG. 11), and, comprises an asymmetrical head 12. The head 12 includes an upper end 67 connected to the distal end of the handle and includes first peripheral side edge 18 and second peripheral side edge 17 each generally parallel to longitudinal axis X. The head 12 also includes a lower end 68 spaced apart from the upper end and the distal end of the handle 11. The lower end of head 12 has a ground engaging edge comprising the arcuate distal edge 16, medial edge 15, and an arcuate proximal edge 14. The head 12 also includes a face 13 extending over the upper and lower ends, and a tip 19 shaped and dimensioned to penetrate earth. In FIG. 11, surface area 13A of face 13 extends to the left of axis X, while surface area 13B of face 13 extends to the right of axis X. Areas 13A and 13B together comprise substantially the entire surface area of face 13. The head 12 includes upper edge 19 (FIG. 11). When digging tool 10 is in its normal upright orientation with axis X vertically oriented, edge or shoulder 19A is generally horizontally oriented in the manner illustrated in FIG. 11.

Further, the lower end 68 of head 12 includes a first convex arcuate peripheral distal edge 16 terminating at tip 19 and extending upwardly to the first peripheral side edge 18 (FIG. 11).

The lower end of head 12 also includes a second convex arcuate proximal edge 14 spaced apart from the first arcuate peripheral distal edge 16, and having an end point 66 spaced apart from and positioned above tip 19. The proximal edge 14 is spaced below the upper end 67 of head 12, and extends upwardly from end point 66 to the second peripheral side edge 17. The radius of curvature of distal edge 16 near tip 19 ordinarily is different than the radius of curvature of edge 14 near point 66. The radius of curvature along most or all of arcuate edge 14 also is normally different from the radius of curvature along most or all of arcuate edge 16. In particular, the radius of curvature of edge 14 normally, although not necessarily, is less than that of edge 16.

The lower end 68 also includes substantially straight medial edge 15 extending from tip 19 upwardly to end point 66 and generally parallel to longitudinal axis X. When digging tool 10 is in its normal upright orientation, edge 15 is substantially vertically oriented in the manner illustrated in FIG. 11. The head 12 can be constructed such that when digging tool 10 is in its normal upright orientation-edge 15 is canted from the vertical and is not substantially vertical. In order, however, for digging tool 10 and edge 15 to perform the rotational and lever functions described below, it is preferred that head 12 be constructed such that edge 15 be canted no more than twenty degrees, preferably no more than ten degrees, and more preferably no more than five degrees from the vertical when digging tool 10 is in its normal upright orientation, which orientation is illustrated in FIG. 11. The ground engaging edge of the lower end 68 of head 12 collectively comprises the distal edge 16, proximal edge 14 and medial edge 15.

Figure 10:
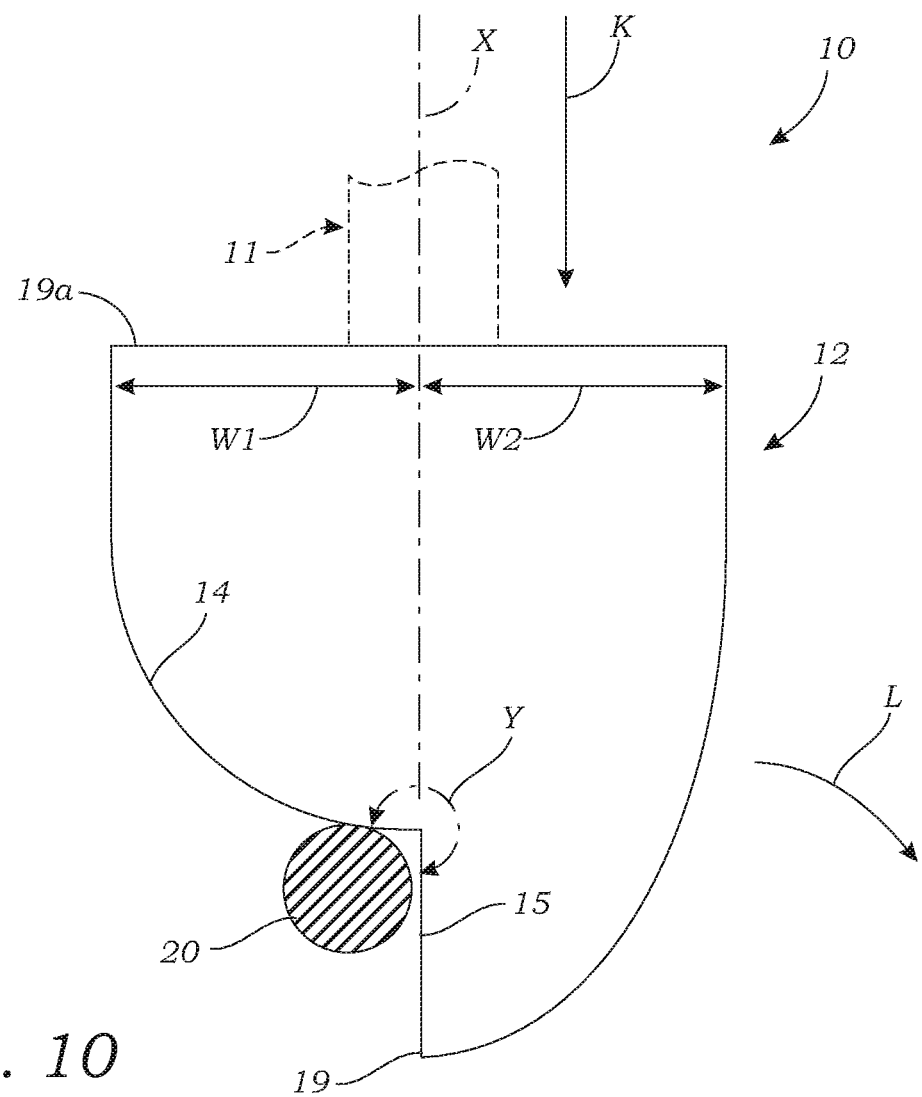
FIG. 10 is a front view illustrating the mode of operation of the digging tool of FIG. 1.

The overall length of head 12 equals the length indicated by arrows A plus the length indicated by arrows B (FIG. 11). Arrows B indicate the length of edge 15. The overall maximum width of head 12 equals the length indicated by arrows W1 plus the length indicated by arrows W2 (FIG. 10). Arrows Y in FIG. 10 indicate an exterior angle extending from edge 15 to the portion of edge 14 adjacent point 66 (FIG. 11). Angle Y can vary, and can, for example, be greater than 270. However, angle Y normally preferably is 270 degrees or less. An angle Y of 270 degrees or less is desirable because, when a downward force K (FIG. 10) is applied the head 12, angle Y facilitates proximal edge 14 sliding laterally over root 20 in the manner indicated by arrow L in FIG. 10. This reduces the likelihood that downward movement of head 13 will be completely stopped if head 12 strikes a root 20.

Digging tool 10 is movable between at least three operative positions comprising first, second, and third operative positions. In the first operative position, illustrated in FIG. 13, tip 19 contacts an external side surface of a root 20 at a pivot point P while the proximal edge 14 is spaced apart from the root.

In the second operative lever position illustrated in FIG. 11, handle 11 is generally vertically oriented; the proximal edge 14 contacts the external top surface of the root 20; and, the medial edge 15 contacts an external side surface of the root 20 at a fulcrum point O such that tip 19 is not positioned directly beneath the root.

In the third operative lever position, handle 11 and head 12 are canted away from vertical, the proximal edge 14 contacts the external top surface of the root 20, and medial edge 15 contacting an external side surface of the root 29 at fulcrum point O such that tip 19 is positioned directly beneath the root 20.

Since digging tool 10 is asymmetrical, the area of surface 13A is smaller than (or at least different from) the area of surface 138. The ratio of the area of surface 138 to the area of surface 13A is in the range of 8.0:3.0 to 3.2:3.0, preferably 6.0:3.0 to 3.25:3.0, more preferably 5.0:3.0 to 3.5:3.0. The ratio of the total length of digging tool 1 O (i.e., the length of arrows A plus the length of arrows 8) to the length of medial edge 15 (i.e., the length of arrows 8) can vary as desired but preferably is in the range of 30.0:1.0 to 1.5 to 1.0, preferably 8.0:1.0 to 1.75:1.0, and more preferably 6.0:1.0 to 2.0 to 1.0.

In use of digging tool 10, an upright individual grasps handle 11 and, in conventional fashion, places one foot on upper edge 19A (FIG. 11) and presses downwardly with the foot to generate a force G to displace tip 19 into the ground. The use of medial edge 15 in combination with distal edge 16 produces a point which functions to more readily penetrate soil that the generally semi-circular or semi-elliptical leading edge of a conventional digging tool. Once digging tool 10 has penetrated a desired distance into the ground, the digging tool is extracted from the ground, carrying with it soil on the face 13 of the digging tool.

The ability of tip 19 and edges 15 and 16 to more readily penetrate the ground is a particular important virtue of digging tool 10. Edge 15 ordinarily provides insignificant frictional resistance as tip 19 travels into the ground. Similarly, edge 16 and the portion of face 13 intermediate edges 15 and 16 provides significantly less frictional resistance than does a conventional digging tool which has a symmetrical head 12 that includes an opposing pair of edges 16 each extending upwardly away from each other and from the tip 19 of the digging tool to produce a generally semi-circular or semi-elliptical leading edge. After head 12 travels into the ground a distance equal to the length B of edge 15, edge 14 begins to penetrate the ground and, along with the portion of face 12 extending upwardly from edge 14, to produce additional frictional resistance which makes forcing head 12 into the ground more difficult.

Digging tool 10 can be positioned such that the digging tool is substantially upright in the manner illustrated in FIG. 11 and such that tip 19 of the face of the digging tool is positioned adjacent a side of a root 20 at a point P. The handle 11 of digging tool 1 O can then be manually tilted such that handle 11 and head 12 move laterally in the direction of arrow L to the canted position illustrated in FIG. 13. When handle 11 and head 12 move in this manner, they are, in essence, pivoting about point P and are using root 20 to counteract a force generated in the direction of arrow S when head 12 pivots in the direction of arrow L. Pivoting head 12 in this manner is useful in loosening earth to one side of root 20 when digging tool 10 is being utilized to remove earth around root 20. Pivoting head 12 in this manner is useful because root 20 often typically does not move readily when digging tool 10 initially removes earth from around root 20, and because the ability to position tip 19 at a side of root 20 facilitates using digging tool 10 as a pivot tool.

Digging tool 10 can be positioned such that (a) the digging tool 10 is substantially upright in the manner illustrated in FIG. 11, (b) a point O on medial edge 15 intermediate point 66 and tip 19 contacts a side of root 20, and (c) proximal edge 14 contacts the top of root 20. The handle 11 of digging tool 10 can then be manually tilted such that handle 11 and head 12 move laterally in the direction of arrow H in FIG. 11 (or arrow L in FIG. 12) to the canted position illustrated in FIG. 12. When handle 11 and head 12 move in this manner, edge 15 functions as a lever and pivots about a fulcrum represented by point O in FIG. 12. Pivoting head 12 in this manner is useful in a couple of respects. First, pivoting head 12 to the position illustrated in FIG. 12 displaces tip 19 to a position beneath root 20 and functions to loosen earth beneath root 20. Second, pivoting head 12 in the direction of arrow L in FIG. 12 moves the convex proximal edge 14 along the top of root 20. The upward convex shape of edge 14 promotes the tendency of edge 14 to slide laterally off root 20 in the direction of arrow L; this because the convex shape of edge 14 produces a lateral "slide inducing" force when an individual using digging tool 10 presses digging tool 10 downwardly in the direction of arrow K.

Figure 12:
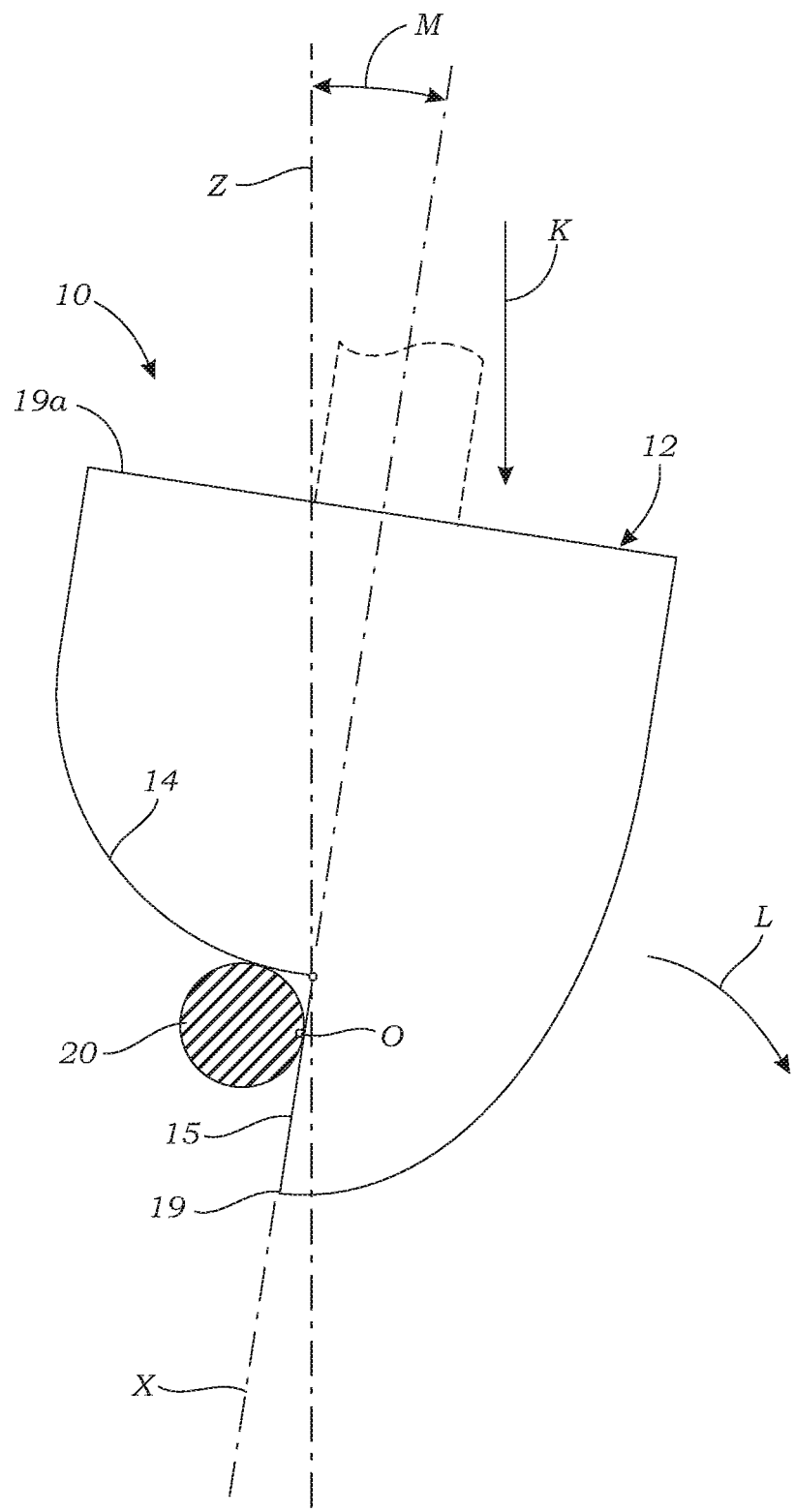
FIG. 12 is a front view further illustrating the mode of operation of the digging tool of FIG. 1.
Figure 13:
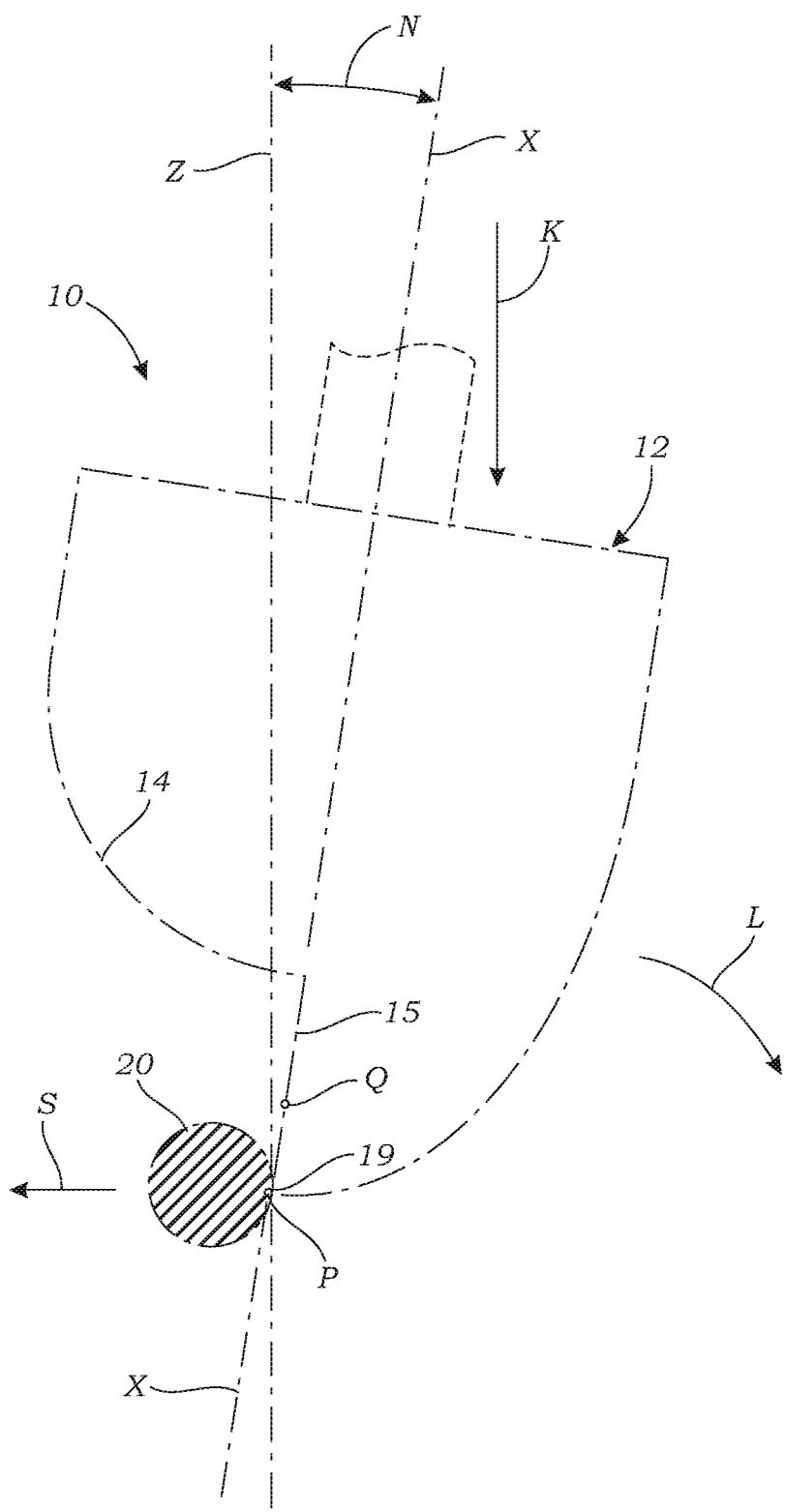
FIG. 13 is a front view further illustrating the mode of operation of the digging tool of FIG. 1.

In FIG. 12, the longitudinal axis X is canted from vertical axis Z through the angle M. In FIG. 13, the longitudinal axis X is canted from vertical axis Z through the angle N.

In one embodiment of the invention, handle 11 is grasped adjacent upper edge 19 and head 12 is utilized like a hatchet, with medial edge 15 comprising the "cutting" edge that is strikes a piece of wood or other object to cut the wood.

The digging tool 10A in FIG. 2 is comparable to digging tool 10 except the arcuate proximal edge 14 is replaced with horizontally oriented straight lateral edge 21. Digging tool 10A includes handle 11 and head 12A. Head 12A includes face 43A and vertically oriented medial edge 15A.

The digging tool 30 in FIG. 3 is comparable to digging tool 10 except head 32 is narrower than head 12. Digging tool 30 includes handle 31 outwardly depending from head 32. Head 32 includes face 33 and vertically oriented medial edge 35. Dashed line 36 represents the generally semi-circular or semi-elliptical edge that ordinarily would be found on a conventional digging tool of the type represented by digging tool 30.

Figures 4, 5:
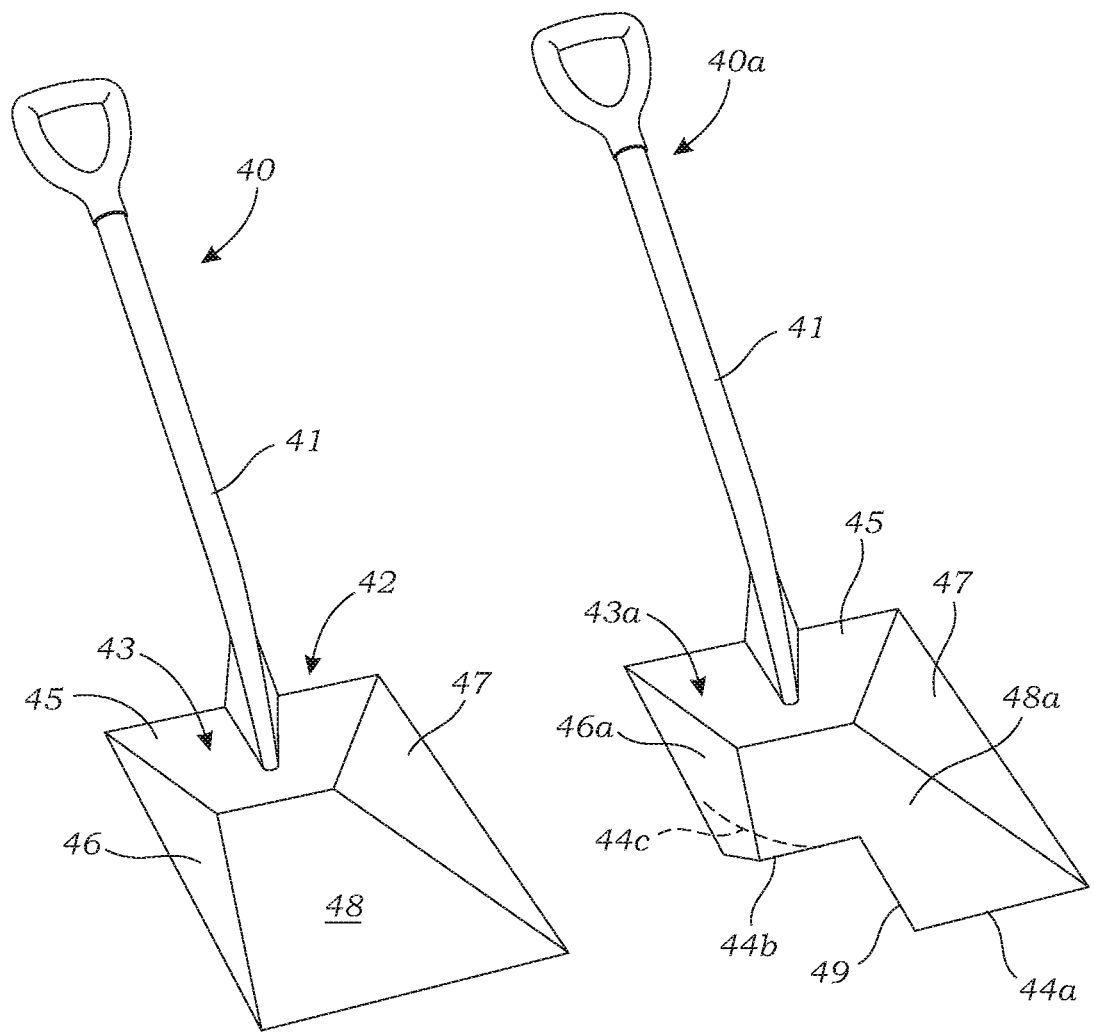
FIG. 4 is a perspective view illustrating a conventional digging tool in the form of a shovel design.
FIG. 5 is a perspective view illustrating the digging tool of FIG. 4 modified in accordance with another embodiment of the invention.

FIG. 4 illustrates a conventional digging tool 40 including handle 41 and head 42. Head 42 includes a face including surfaces 45, 46, 47 which collectively cant downwardly to and terminate at surface 48. Surface 48 includes leading edge 44. Surface 45 co-terminates with the upper portion or shoulder of head 42.

Digging tool 40A in FIG. 5 is generally equivalent to digging tool 40 except that medial edge 49 and lateral edge 44B have, in accordance with the invention, been formed in the digging tool. Consequently, leading edge or tip 44 has been shortened to produce a smaller edge or tip 44A, and the size of head 42 has been reduced to produce a surface 48A which is smaller than surface 48. The size of canted surface 46 is also reduced to produce surface 46A. Dashed line 44C indicates an arcuate proximal edge construct which can, if desired, be utilized in place of lateral edge 44B. Surface 45 co-terminates with the upper portion or shoulder 43A of the head of the shoulder.

Figure 6:
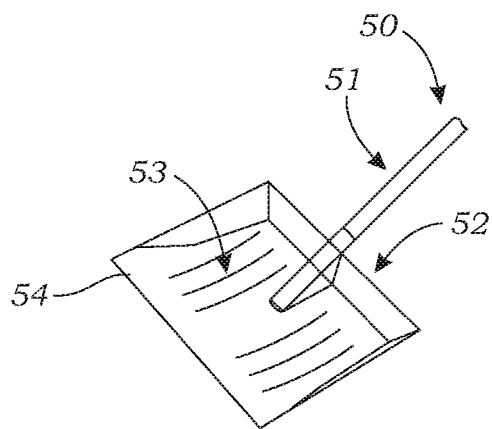
FIG. 6 is a perspective view illustrating a conventional snow digging tool in the form of a shovel.
Figure 7:
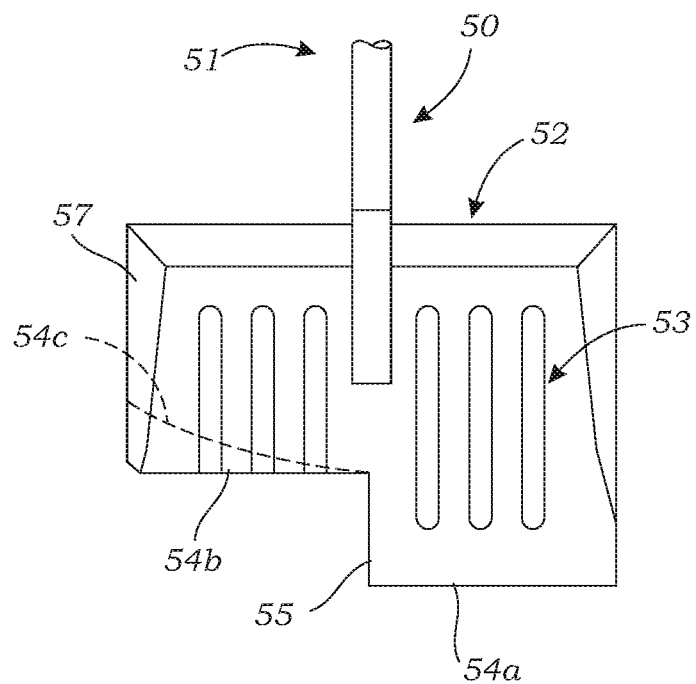
FIG. 7 is a front view illustrating the snow digging tool of FIG. 6 modified in accordance with the invention.

The snow digging tool 50 illustrated in FIG. 6 includes handle 51 and head 52. Head 52 includes face 53 and leading edge, or tip, 54. In FIG. 7, digging tool 50 has been modified in accordance with the invention by forming a vertical medial edge 55 and horizontal lateral edge 54B in head 52. Dashed line 54C indicates an arcuate proximal edge which can, if desired, be utilized in place of distal edge 54B. Also, in FIG. 6, leading edge, or tip, 54 of digging tool 50 has been shorted into tip 54A.

Figure 8:
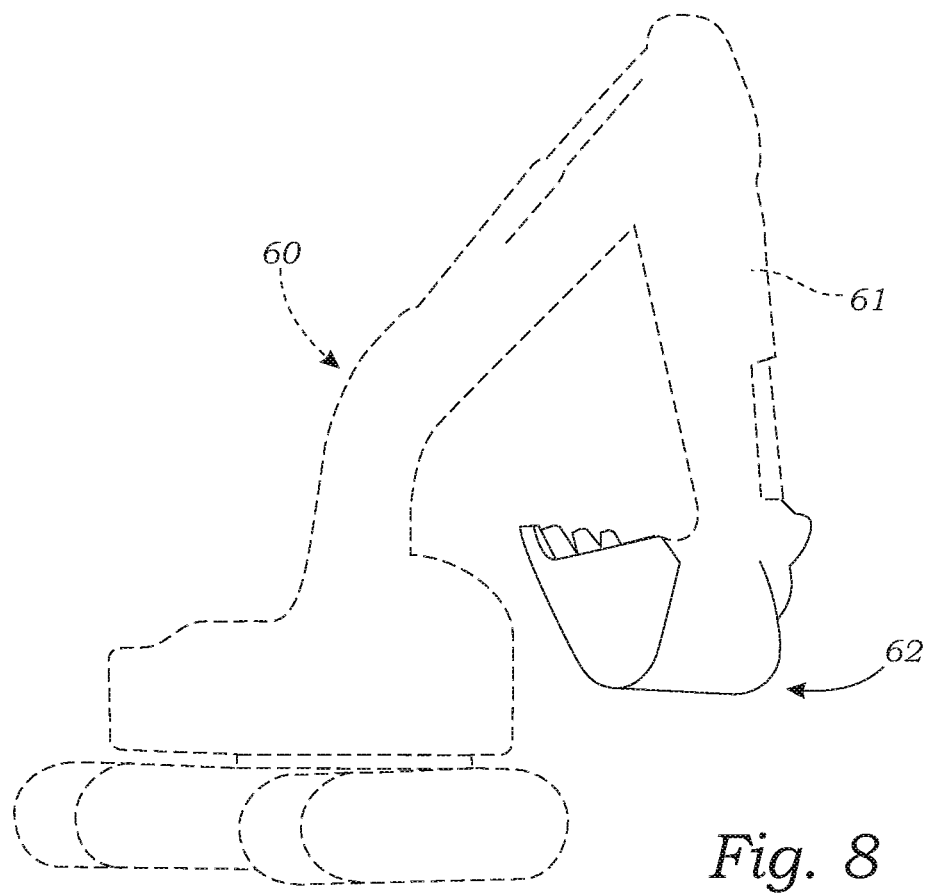
FIG. 8 is a perspective view produced partially as a ghost image and illustrating a digging tool on a vehicle scooper.
Figure 9:
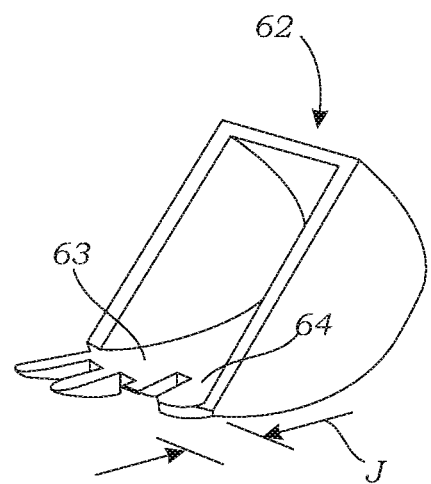
FIG. 9 is a perspective view illustrating the digging tool of FIG. 8 modified in accordance with the principles of the invention.

FIG. 8 illustrates a steam digging tool 60 with a support arm (i.e., a "handle") 61. Digging tool head 62 is mounted on the end of arm 61. In FIG. 9, head 62 has been modified in accordance with the invention by shortening one half 64 of the floor of the digging tool. The other half 63 of the floor retains its conventional shape and dimension. The amount by which half 64 is shortened, or offset, is indicated by arrows J.

Figure 14:
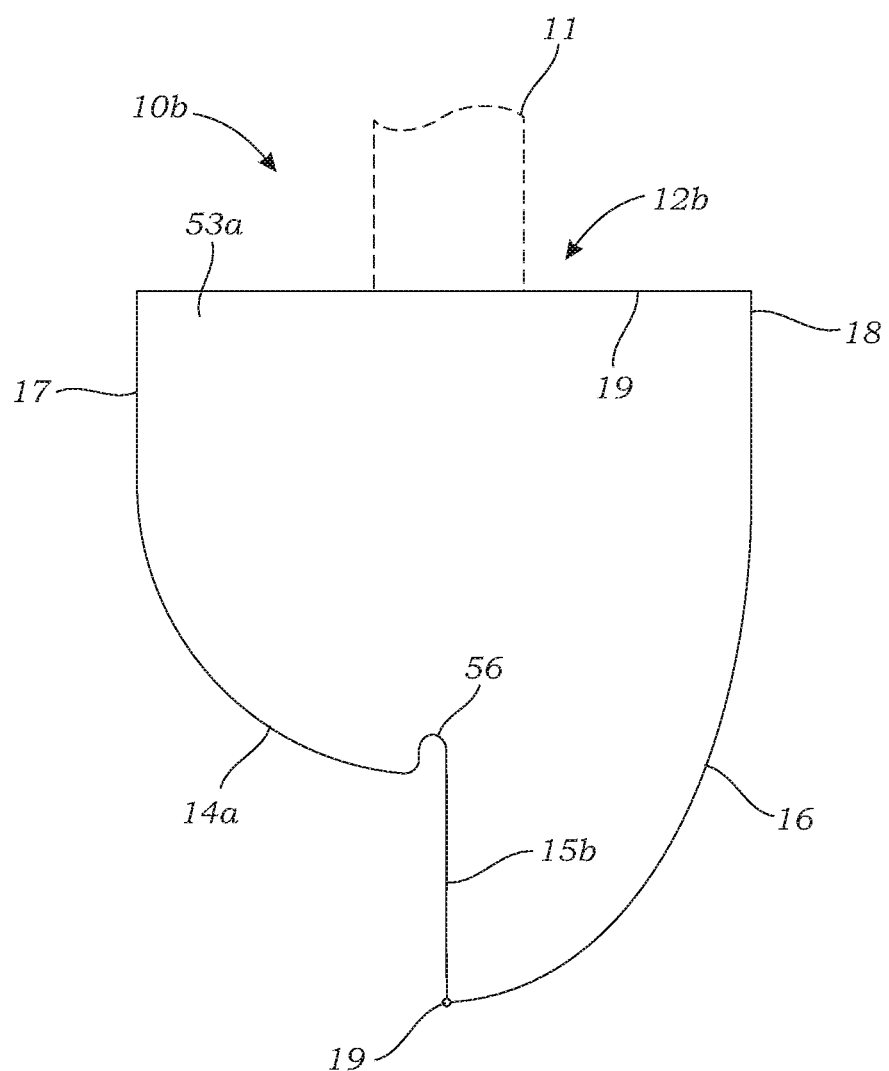
FIG. 14 is a front view illustrating a digging tool constructed in accordance with an alternate embodiment of the invention.

FIG. 14 illustrates a digging tool 10B constructed in accordance with another embodiment of the invention and including an elongate handle 11, and including a head 12B with a face 53A, with tip 19A, with proximal edge 14A, with medial edge 15B, with distal edge 16, with first side edge 18, and with second side edge 17. Head 12B also includes one or more notches 56 formed to bridge proximal edge 14A and medial edge 15B. The shape of notch 56 can vary and can, for example, be V-shaped instead of the U-shape illustrated in FIG. 14. In FIG. 14, the lower end of proximal edge 14A is adjacent the upper end of medial edge 15B.

Figure 15:
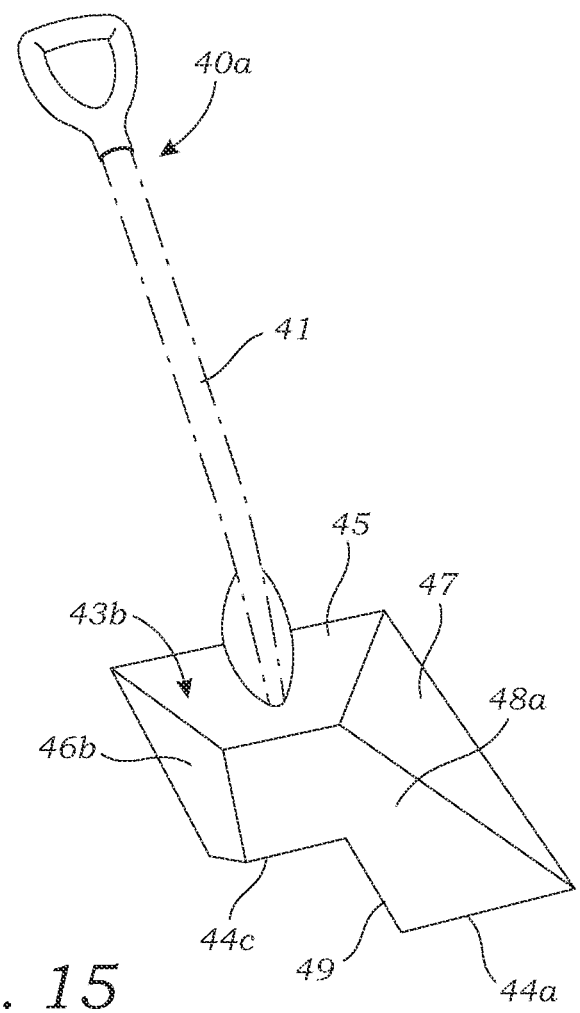
FIG. 15 is a perspective view illustrating a digging tool constructed in accordance with still another embodiment of the invention.

Digging tool 40B in FIG. 15 is generally equivalent to digging tool 40A in FIG. 5 except that the four-sided portion of digging tool 40A including surface 46A is replaced in digging tool 40B by a three-sided portion including surface 46B.

Figure 16:
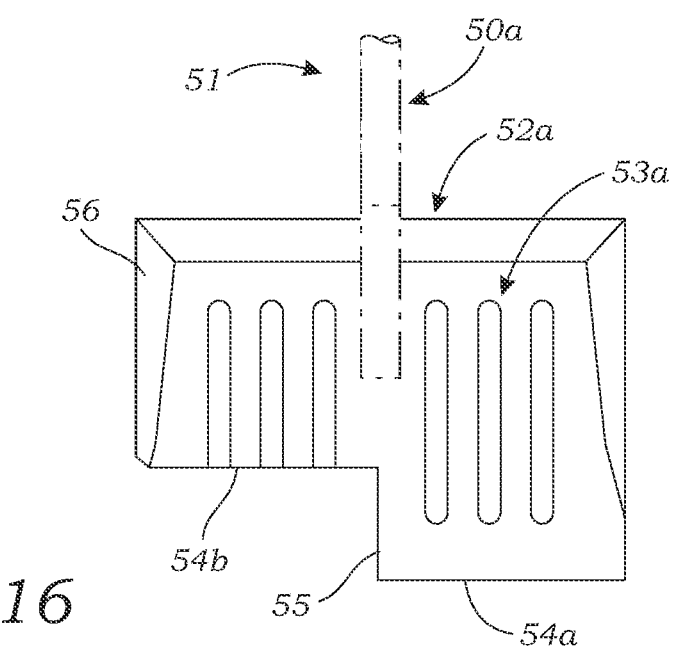
FIG. 16 is a front view illustrating a digging tool constructed in accordance with still a further embodiment of the invention.

Similarly, digging tool 50A in FIG. 16 is generally equivalent to digging tool 50 in FIG. 7 except that the four-sided portion of digging tool 50 including surface 57 is replaced in digging tool 50A by a three-sided portion including surface 56. Surface 45 co-terminates with the upper portion or shoulder 43B of the digging tool.

Figure 17:
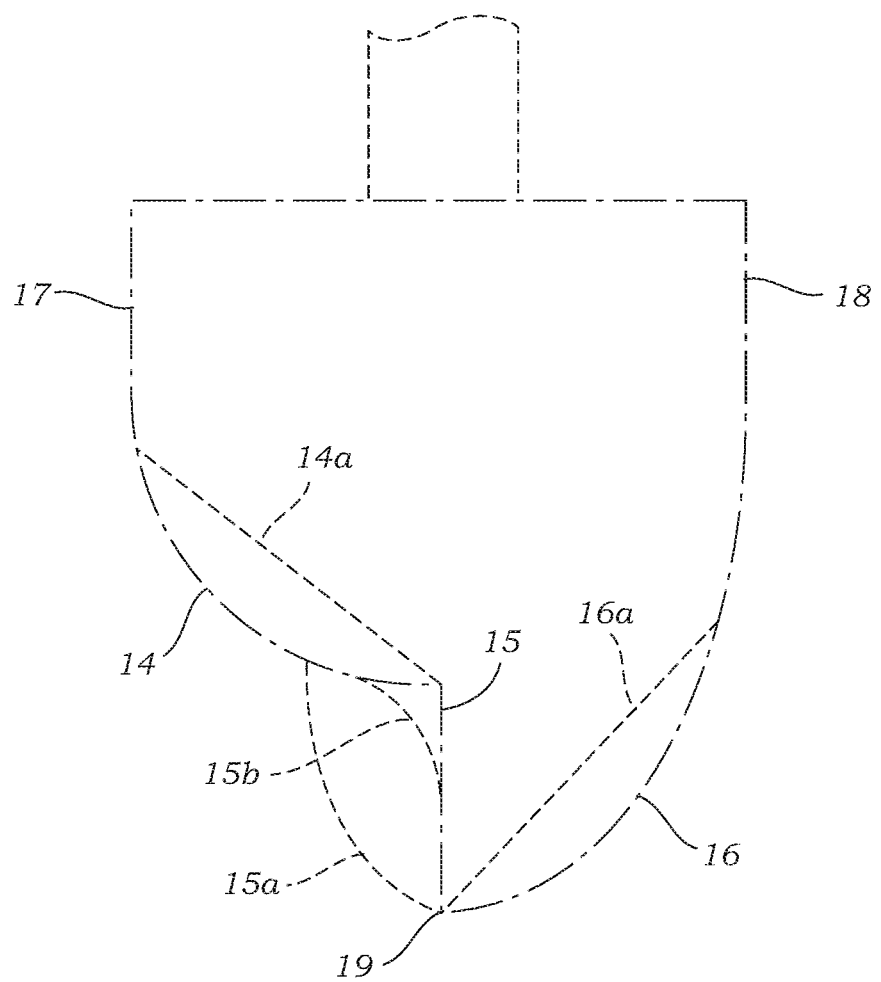
FIG. 17 is a front view illustrating a digging tool constructed in accordance with other embodiment of the invention.

FIG. 17 illustrates with dashed lines various other possible embodiments of the invention derived from the digging tool illustrated in FIG. 1. As indicated by dashed lines 14A, proximal edge 14 can be replaced by a relatively straight proximal edge. Medial edge 15 can, as indicated by dashed lines 15A, be replaced by a vertically oriented convex medial edge. The transition from a medial edge 15 to a proximal edge 14 can be accomplished using a radial edge indicated by dashed lines 15B. Distal edge 16 can, as indicated by dashed lines 16A, be replaced by a straight canted edge.

Figure 18:
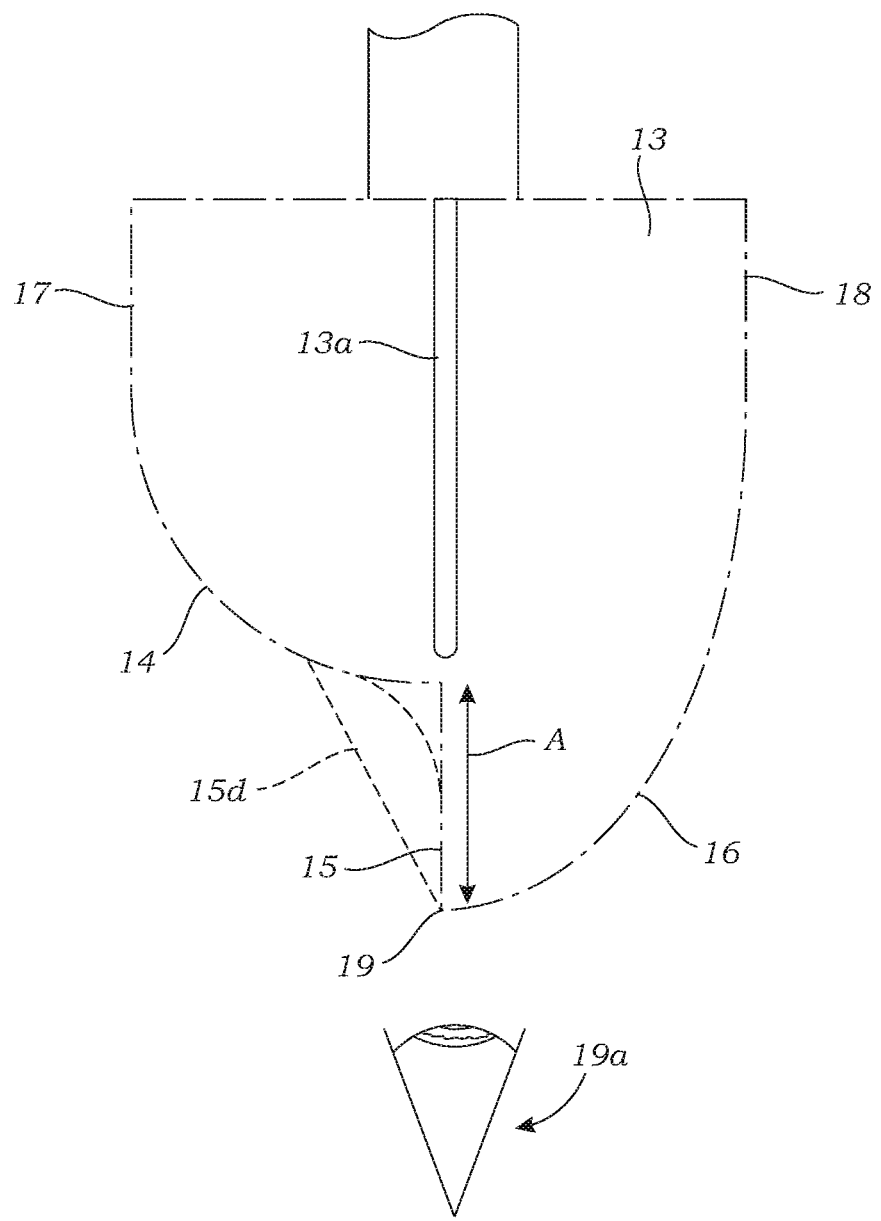
FIG. 18 is a front view illustrating a digging tool constructed in accordance with other embodiment of the invention.

In FIG. 18, vertically oriented medial edge 15 can, as indicated by dashed lines 15D, be replaced by a vertically oriented canted edge. One or more ribs 13A can be formed in or on the digging tool head to structurally strengthen the head. Eye 19A illustrates an individual looking upwardly from beneath the head of the digging tool. This is the type of view illustrated in FIGS. 23 to 25.

Figure 19:
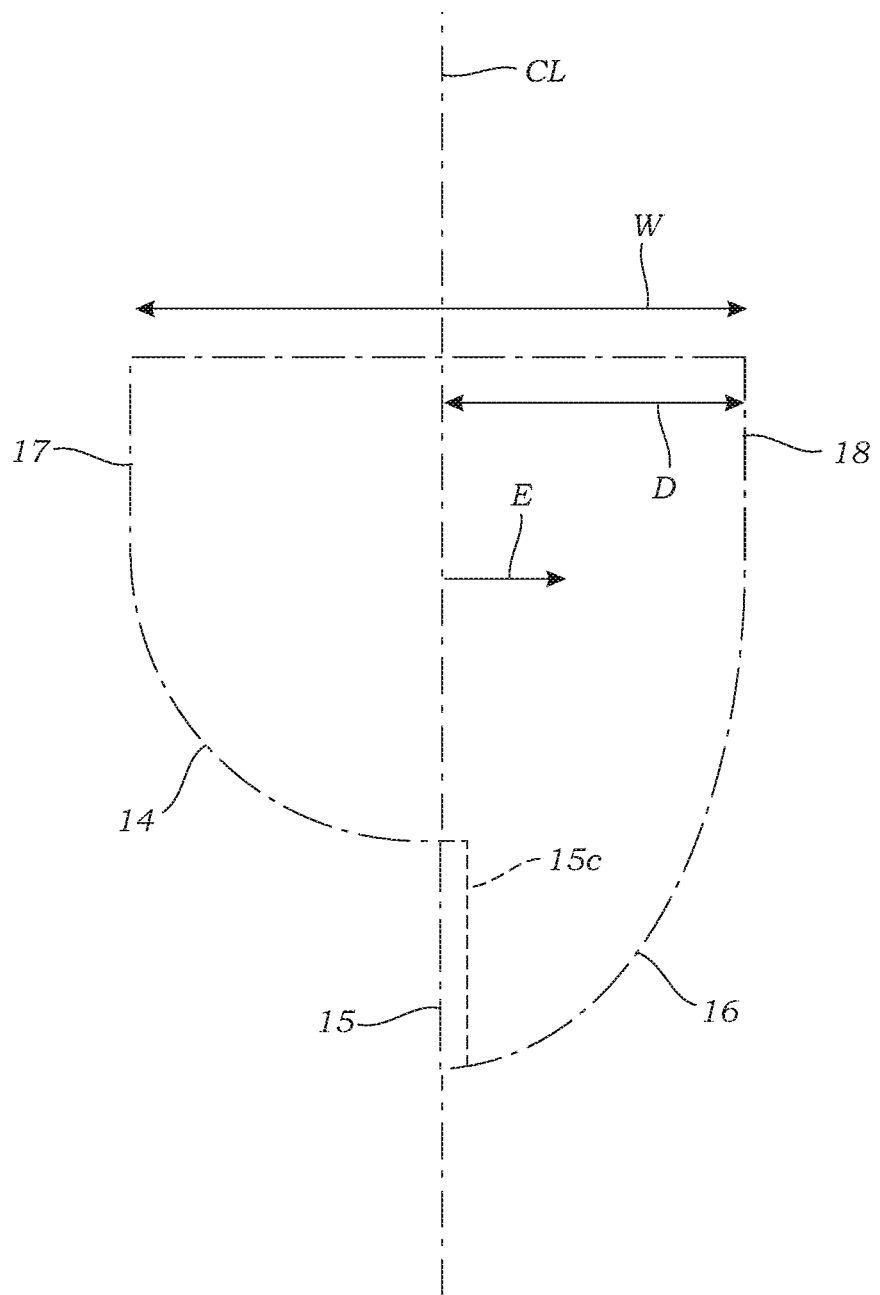
FIG. 19 is a front view illustrating a digging tool constructed in accordance with other embodiment of the invention.

In FIG. 19, arrows W indicate the width of the digging tool head a measured at the shoulder of the digging tool head. Arrows D indicate the width of the right hand side of the digging tool head as measured from a vertical axis CL extending upwardly from and through the tip of the digging tool. If, when the head of the digging tool is fabricated, the medial edge 15 is moved laterally to the position indicated by dashed lines 15C, then the vertical axis CL moves laterally in the direction of arrow E, and the width indicated by arrows D is reduced.

Figure 20:
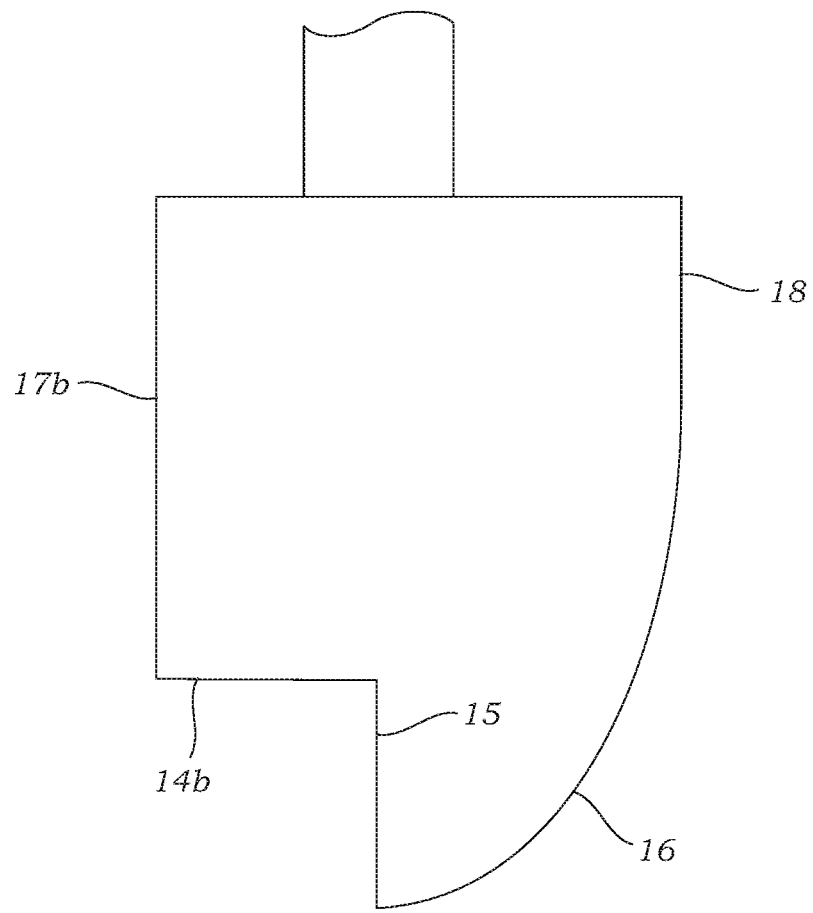
FIG. 20 is a front view illustrating a digging tool constructed in accordance with other embodiment of the invention.

In the embodiment of the invention illustrated in FIG. 20, the lateral edge 14B comprises a horizontally oriented edge which extends from medial edge 15 to the second side edge 17B.

Figure 21:
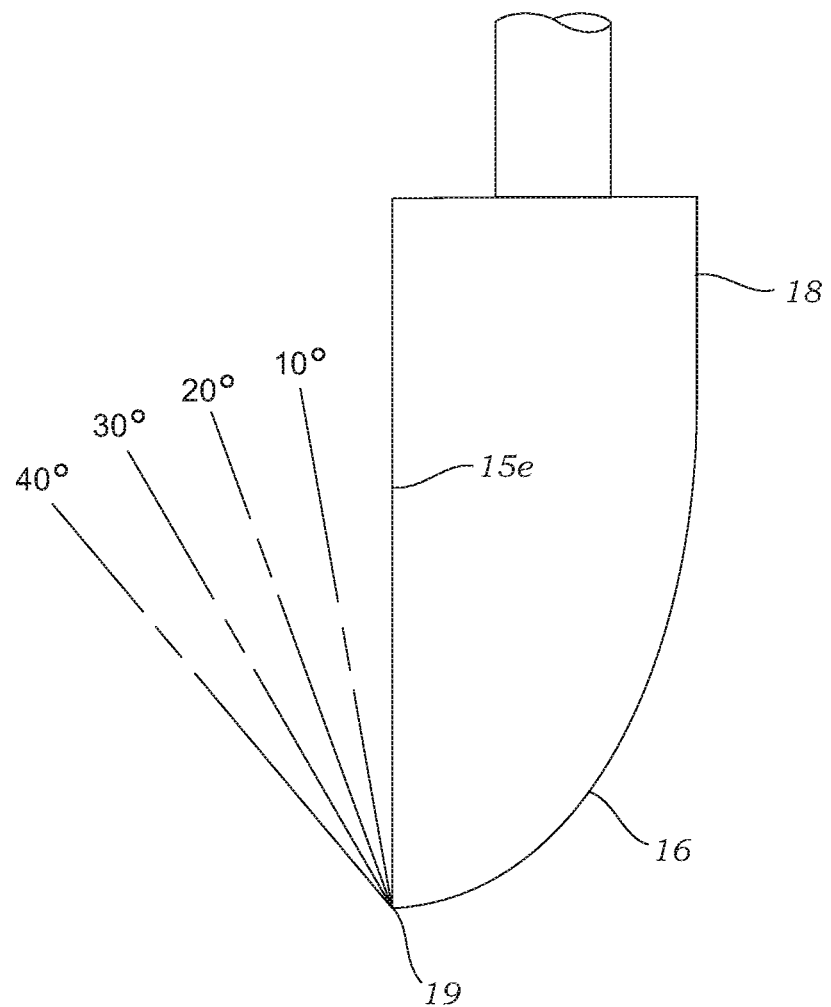
FIG. 21 is a front view illustrating a digging tool constructed in accordance with other embodiment of the invention.

FIG. 21 illustrates how the vertically oriented medial edge of the digging tool of the invention can cant from the vertical by any desired angle including without limitation angles of 1 O degrees, 20 degrees, 30 degrees, and 40 degrees. In currently preferred embodiments of the invention, however, the cant from vertical of medial edge 15E is less than 40 degrees, preferably less than 30 degrees, more preferably less than 20 degrees, and most preferably less than ten degrees.

Figure 22:
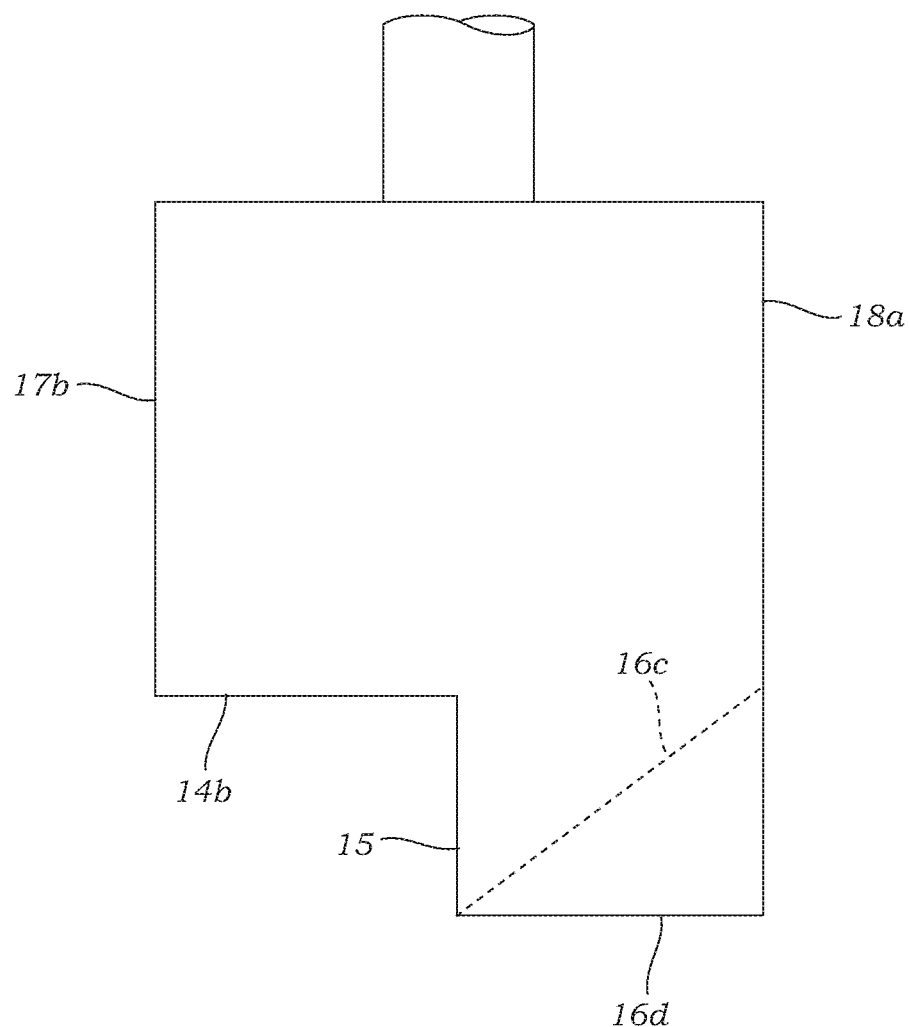
FIG. 22 is a front view illustrating a digging tool constructed in accordance with other embodiment of the invention.

In FIG. 22, horizontally oriented proximal edge 14B extends between medial edge 15 and second side edge 17B. Tip 16D extends between medial edge 15 and peripheral side edge 18A. As indicated by dashed lines 16C, peripheral side edge 18A can be supplanted by distal edge 16C, in which case the remaining portion of edge 18A becomes the first side edge.

Figure 23:
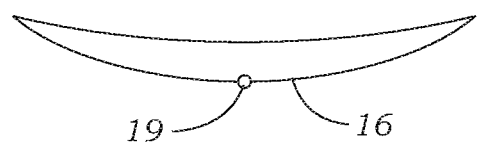
FIG. 23 is a bottom view illustrating the digging tool of FIG. 18.
Figure 24:
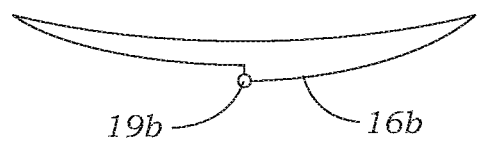
FIG. 24 is a bottom view illustrating the digging tool of FIG. 18 modified by incorporating a downwardly titled tip.
Figure 25:
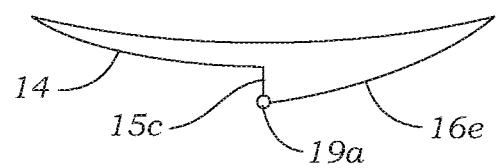
FIG. 25 is a bottom view illustrating the digging tool of FIG. 18 modified by incorporating a downwardly titled tip.

FIG. 23 illustrates the digging tool of FIG. 18 as viewed 19A from the bottom of the digging tool, except rib 13A is not shown. FIG. 24 illustrates, from the same point of view 19A, a digging tool comparable to the digging tool of FIG. 18, except that the tip 19B and distal edge 16B of the digging tool are downwardly bent. FIG. 25 also illustrates, from the same point of view 19A, a digging tool comparable to the digging tool of FIG. 18, except that the tip 19A and distal edge are downwardly bent to an even greater degree. In FIG. 25, the medial edge is indicated by reference character 15C.

Figure 26:
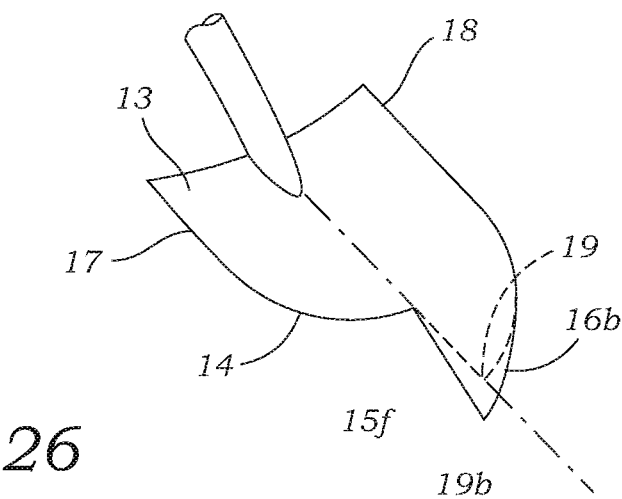
FIG. 26 is a perspective view further illustrating the digging tool of FIG. 24.

FIG. 26 illustrates how the tip 19B and distal edge 16B in FIG. 24 are downwardly bent.

Figure 27:
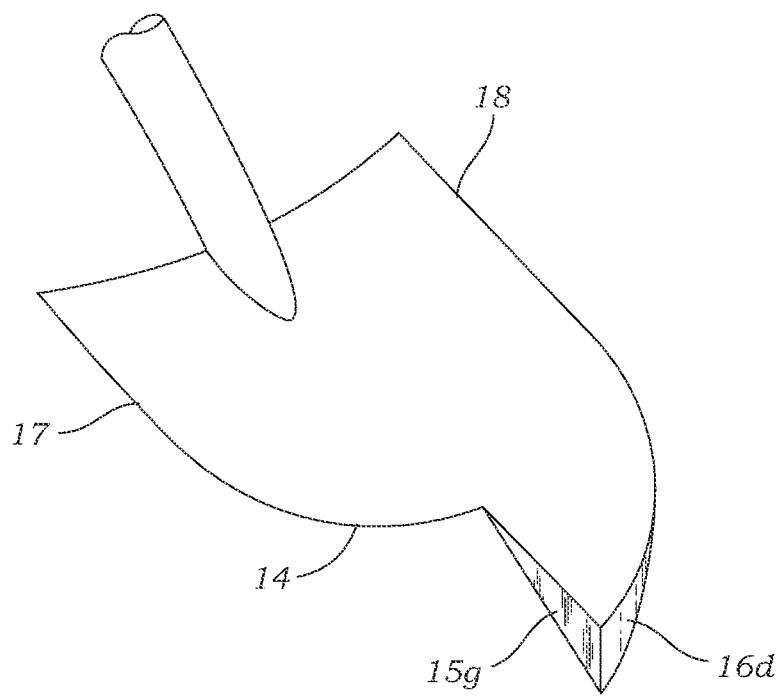
FIG. 27 is a perspective view illustrating another embodiment of the digging tool of the invention.

In FIG. 27, the medial edge 15G and distal edge 16D are widened or thickened to strengthen structurally these portions of the digging tool.

Figure 28:
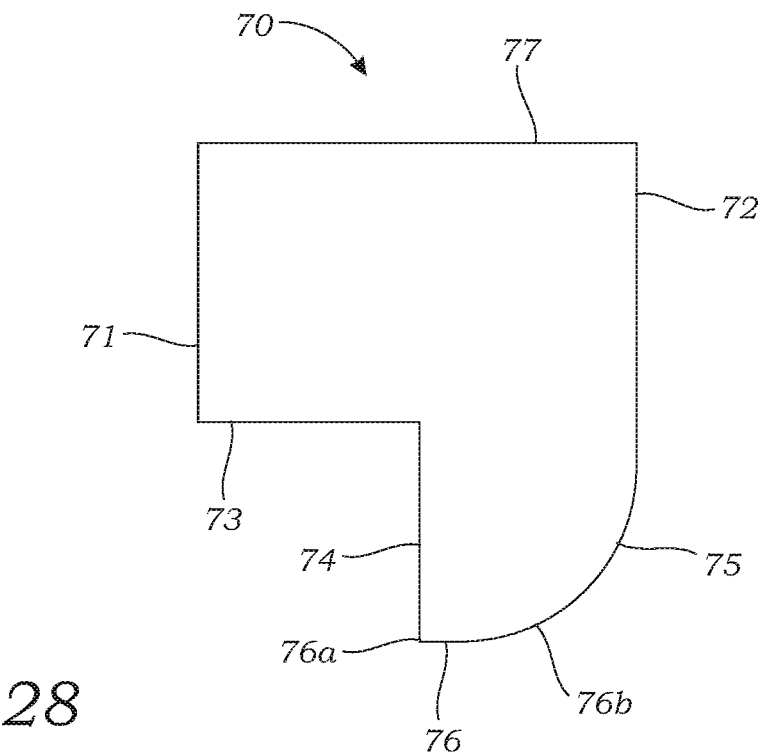
FIG. 28 is a front view illustrating another embodiment of a digging tool head utilized in the invention.

The digging tool head 70 in FIG. 28 includes shoulder 77, first side edge 72, second side edge 71, lateral proximal edge 73, medial edge 74, tip 76, and arcuate distal edge 75.

Figure 29:
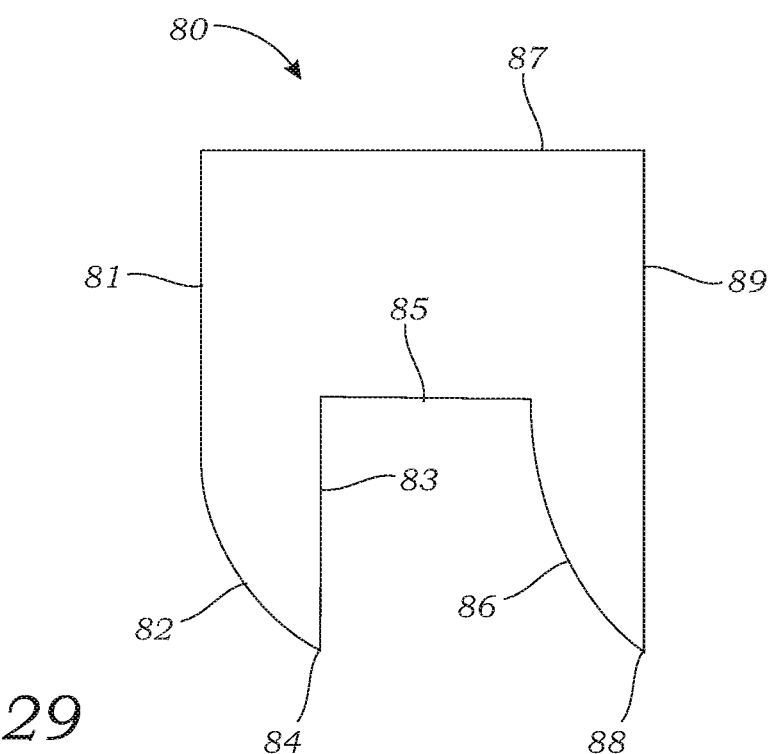
FIG. 29 is a front view illustrating still a further embodiment of a digging tool head utilized in the invention.

The digging tool head 80 in FIG. 29 includes shoulder 87, first peripheral side edge 89, second side edge 81, lateral edge 85, tip 88, first arcuate convex edge 86, tip 84, second arcuate convex edge 82, and medial straight edge 83.

Figure 30:
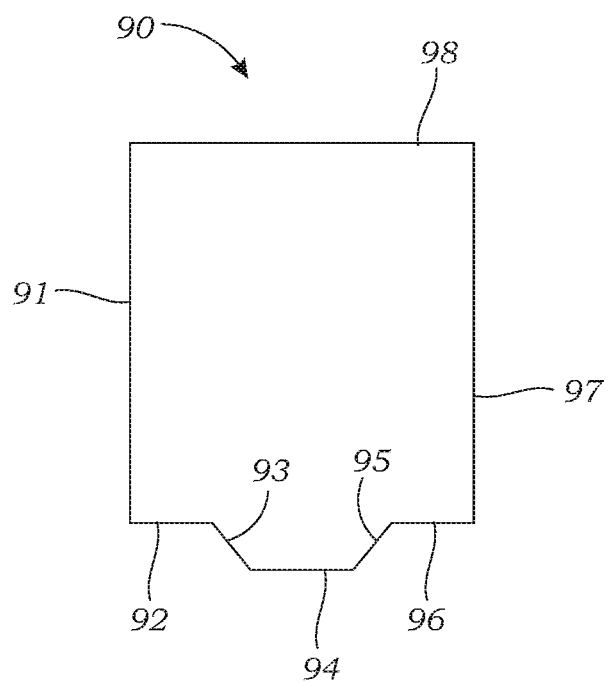
FIG. 30 is a front view illustrating yet still a further embodiment of a digging tool head utilized in the invention.

The digging tool head 90 in FIG. 30 includes shoulder 98, first side edge 97, second side edge 91, tip 94, medial straight edges 93 and 95, and lateral edges 92 and 96.

Figure 31:
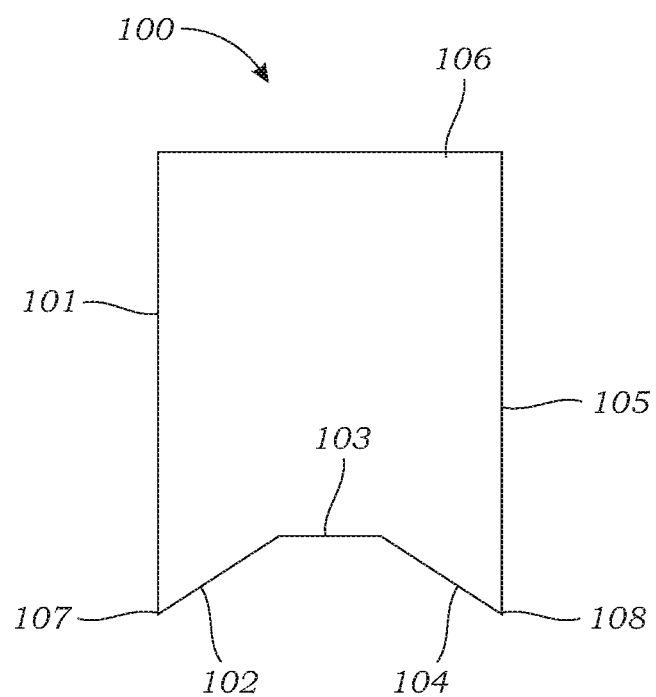
FIG. 31 is a front view illustrating yet still a further embodiment of a digging tool head utilized in the invention.

The digging tool head 100 in FIG. 31 includes shoulder 106, first side edge 105, second side edge 101, tip 107, first medial edge 102, tip 108, second medial edge 104, and lateral edge 103.

Figure 32:
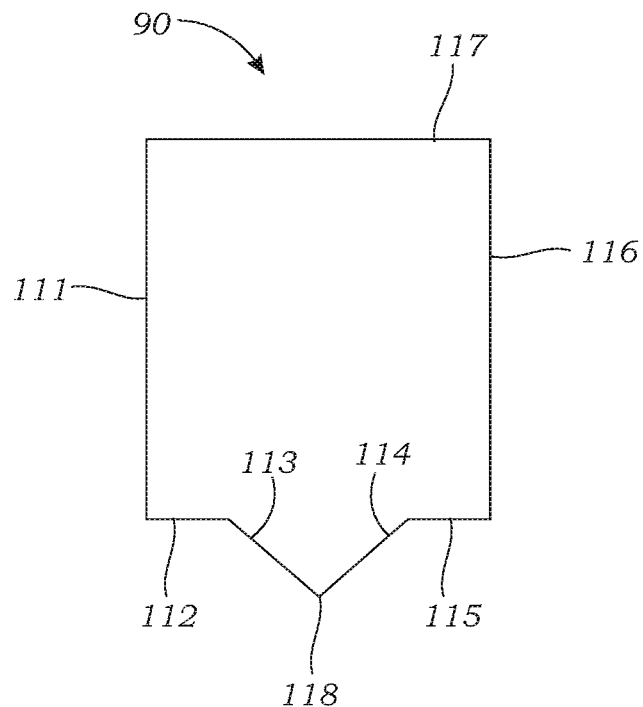
FIG. 32 is a front view illustrating a further embodiment of a digging tool head utilized in the invention.

The digging tool head 110 in FIG. 32 includes shoulder 117, first side edge 116, second side edge 111, tip 118, medial edges 113 and 114, and lateral edges 112 and 115.

Figure 33:
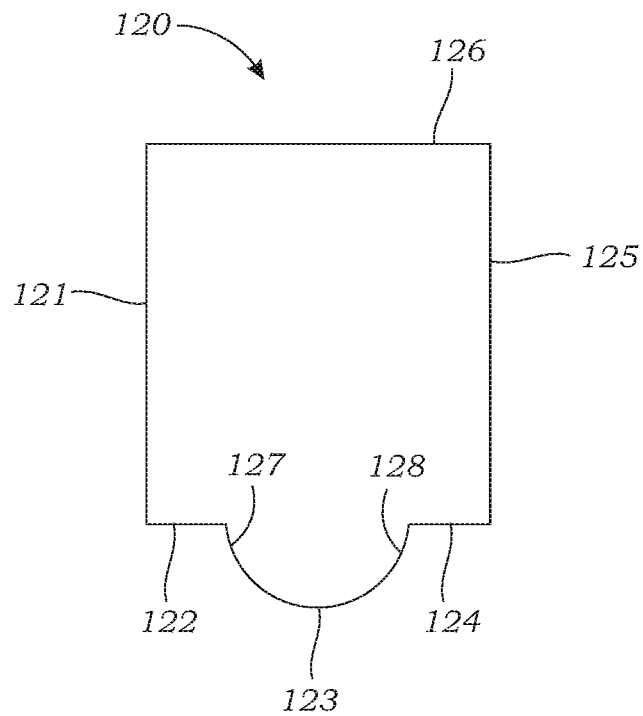
FIG. 33 is a front view illustrating another embodiment of a digging tool head utilized in the invention.

The digging tool head 120 in FIG. 33 includes shoulder 126, first side edge 125, second side edge 121, tip 123, arcuate convex medial edges 127 and 128, and lateral edges 122 and 124.

Figure 34:
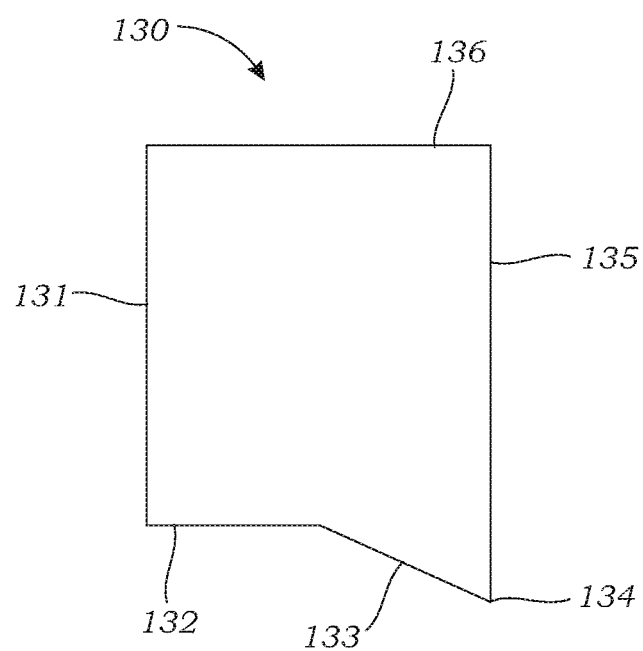
FIG. 34 is a front view illustrating still a further embodiment of a digging tool head utilized in the invention.

The digging tool head 130 in FIG. 34 includes shoulder 136, first side edge 135, tip 134, medial edge 133, lateral edge 132, and second side edge 131.

Figure 35:
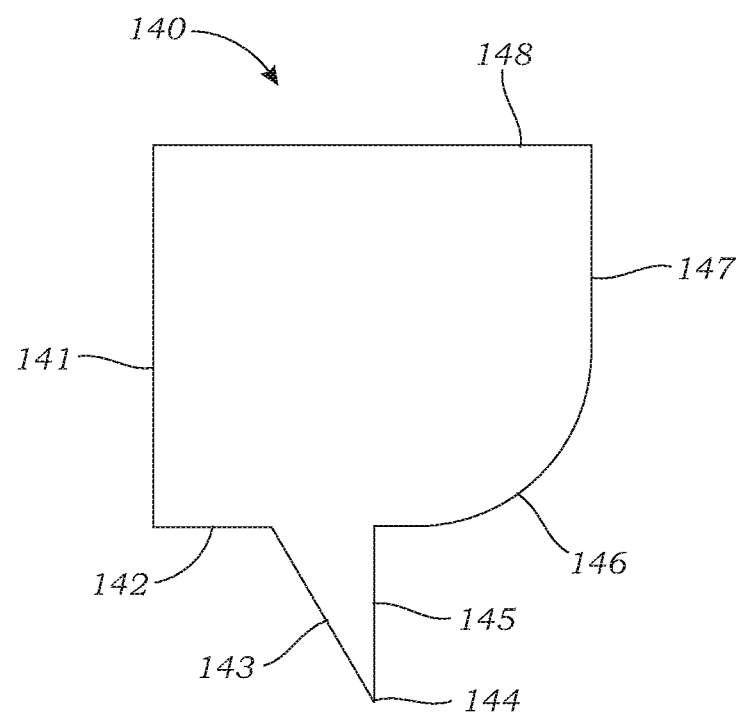
FIG. 35 is a front view illustrating still another embodiment of a digging tool head utilized in the invention.

The digging tool head 140 in FIG. 35 includes shoulder 148, first side edge 147, second side edge 141, tip 144, medial edges 143 and 145, and lateral edge 142 and convex peripheral edge 146.

A further description of embodiments of the invention is set forth below.

The Basic Digging tool: The digging tool includes a head and a handle attached to and extending outwardly from the head. The head is shaped to be forced into the ground or another material to remove earth or another material.

Vertically Oriented and Horizontally Oriented: The terms vertically oriented and horizontally oriented as used below assume that the digging tool is in an upright position with the handle vertically oriented and generally perpendicular to the ground.

Left Hand and Right Hand: The terms left hand and right hand as used below assume that the digging tool is in an upright position with the handle vertically oriented and generally perpendicular to the ground, and assumes that an observer is positioned forwardly of the digging tool in a position where the observer can view the face but not the back of the head of the digging tool.

The Head: The head includes an upper portion connected to the handle, a lower portion which extends downwardly from the upper portion, a front face, a rear face, a starboard (right hand) edge structure, and a port (left hand) edge structure.

a. The upper portion normally is the widest portion of the head, or at least one of the widest portions, and includes a shoulder which extends across the top of the upper portion. A user rests his foot on the shoulder to drive the head into the ground or into another material being moved or excavated with the digging tool.

b. The lower portion includes the tip of the digging tool.

c. The front face extends over the front of both the upper portion and the lower portion.

d. The rear face is opposed to the front face and extends over the rear of both the upper portion and lower portion.

e. The first side edge structure extends from the tip of the head up to the shoulder.

f. The second side edge structure extends from the tip of the head up to the shoulder.

In other embodiments of the invention, the medial edge is canted from the vertical but still extends upwardly from the tip of the head of the digging tool. The shape and dimension of the proximal edge can vary as desired, but currently is an arcuate edge which extends outwardly and upwardly from the medial edge. Importantly, the proximal edge is an offset edge because it is offset from the tip of the head of the digging tool. The proximal edge includes an inner end which terminates at or near the top of the medial edge, and includes an outer end.

The proximal edge is generally horizontally oriented at least adjacent the upper end of the medial edge, while the medial edge presently is normally generally vertically oriented.

In some embodiments of the invention, the proximal edge is canted upwardly from the horizontal but still extends outwardly from the upper end of the medial edge.

In some embodiments of the invention, the medial edge and/or the proximal edge are arcuate or have other desired shapes. Regardless, however, of the shape and dimension of the proximal and medial edges, the proximal edge is still offset from the tip of the head of the digging tool, and the medial edge extends upwardly from the tip of the head of the digging tool. Similarly, regardless of the shape of the distal edge of the starboard edge structures, the distal edge extends outwardly and/or upwardly from the tip of the head of the digging tool.

Offsetting the proximal edge is critical in the practice of the invention because it significantly reduces the size of the proximal edge (of the starboard edge structure) which is initially forced into the ground when the digging tool is being used.

The second side edge extends from or near the outer end of the proximal edge up to the shoulder of the head. Preferably, the second side edge is relatively straight, but the shape and dimension of the second side edge can vary as desired, as is the case with the other peripheral edges of the digging tool of the invention. The outer end of the arcuate proximal edge can terminate at the shoulder of the head, providing little side edge.

Dimensions: The width of the upper portion of the head of a standard manually operated digging tool configured in accordance with the invention to dig dirt can vary as desired, but presently the width of the upper portion of the head is in the range of three inches to ten inches. The basic digging tool currently preferred has a shape and dimension comparable to that illustrated in FIGS. 1 and 10 to 13 and, has a width (W1+W2 in FIG. 10) of about nine inches. The width of a snow digging tool or other kind of "larger digging tool", however, can be up to twenty-four inches or more, if desired. The width of a spade or other kind of "smaller digging tool" can be less than three inches, if desired.

The greatest width of the lower portion of the head, i.e., the width of a horizontal line (assuming the digging tool is, as noted, upright and the handle is vertically oriented) extending from the medial edge 15 to the distal edge 16 (FIG. 11) or, when appropriate, to the first proximal edge 14, is in the range of 1 inch to 8 inches. In the basic digging tool noted above, the greatest width of the lower portion of the head extends from medial edge 15 to proximal edge 16 and is about three inches.

The length, indicated by arrows B in FIG. 10 and arrows A in FIG. 18, of the medial edge is in the range of ½ inch to 6 inches in a standard manually operated digging tool for digging dirt, and preferably is in the range of one inch to four inches, more preferably one inch to three inches. The length of the medial edge can vary as desired for other kinds of digging tools. In the basic digging tool noted above, the length of the medial edge is about two and one-half inches. The length of the medial edge equals the vertical distance traversed by the medial edge; consequently, in FIG. 17, the length of medial edge 15 is the same as the length of the medial edge represented by dashed line 15A because each edge 15, 15A traverses the same vertical distance.

In a similar manner, the length of the distal edge 16 equals the vertical distance traversed by the proximal edge; accordingly, in FIG. 17 the length of the portion of arcuate distal edge 16 extending from tip 19 to the intersection with the upper end of dashed line 16A is the same as the length of the proximal edge represented by dashed line 16A.

In a similar manner, the length of the proximal edge equals the horizontal distance traversed by the distal edge; accordingly, in FIG. 17 the length of the portion of proximal arcuate edge 14 extending from medial edge 15 to the upper end of dashed line 14A is the same as the length of the medial edge represented by dashed lines 14A.

The height of the head, which extends vertically from the tip of the head to the shoulder of the head can vary as desired, but typically is in the range of six inches to thirteen inches in a standard manually operated digging tool for digging dirt. The height of the head can vary as desired for other kinds of digging tools. In the basic digging tool noted above, the height of the head is about eleven inches. By way of example, in FIG. 1, the height of the head equals the height indicated by arrows A plus the height indicated by arrows B.

The length of the proximal arcuate edge is typically in the range of one inch to eight inches for a standard manually operated digging tool for digging dirt, but it can vary as desired. The length of the proximal edge can vary as desired for other kinds of digging tools. In the basic digging tool noted above, the length of the proximal edge is equal to the width W1 in FIG. 10 and is therefore about five and one-half inches. Consequently, as used herein, the "length" of the proximal edge is, as noted above, the lateral distance traversed by the proximal edge in extending from the medial edge to either a second proximal edge or to the shoulder of the head of the digging tool, as appropriate. Similarly, the "length" of the proximal edge is the lateral distance traversed by the proximal edge in extending from the tip of the digging tool to the first distal edge or to the shoulder of the digging tool as appropriate. In the basic digging tool noted above, the length of the proximal edge is equal to the width W2 in FIG. 1 O and is therefore about five and one-half inches. In FIG. 1, the length of the proximal edge is indicated by arrows E. The length of the distal edge is indicated by arrows F. The height of the second side edge is indicated by arrows D. The height of the first side edge is indicated by arrows C. The total vertical length traversed by arcuate proximal edge 14 and the second side edge is indicated by arrows A. The length of the medial edge 15 is indicated by arrows B.

Offset of the Proximal Edge. As noted, the offset of the proximal edge from the tip of the head of the digging tool is, as noted, critical in the practice of the invention. The end of the proximal edge which is near or co-terminates at the upper end of the medial edge is a distance from the tip which is in the range of 5% to 75%, preferably 10% to 65%, more preferably 15% to 50%, and most preferably 20% to 40%, of the height of the head of the digging tool.

Ribs. The head of the digging tool can include ribs which structurally strengthen the head. Raised ribs can be stamped into the head, can be welded on to the head, or can otherwise be formed on or in the head.

Asymmetry. The shape of the head of the digging tool of the invention is presently preferably necessarily asymmetrical, although symmetrical embodiments of the invention are, as can be seen in the drawings, possible.

Sides. When the asymmetrical digging tool of FIG. 10 (or FIGS. 1-3, 11 to 14, 17 to 20, 23 to 27, 35) is upright with the handle generally vertically oriented, when the tip 19 of the digging tool is generally centrally located and is a point in the manner illustrated in FIG. 10, and an imaginary vertical line is drawn which extends upwardly from the tip 19, the left side of the digging tool head extends to the left of the vertical line and the right side of the digging tool head extends to the right of the vertical line. The size of the left side and of the surface area of the portion of the face of the digging tool head which extends over the left side is smaller than the size of the right side and of the surface area of the portion of the face of the digging tool which extends over the right side (or vice-versa if the offset 14 is on the right side of the head instead of the left side as shown in FIG. 10).

When the asymmetrical digging tool of FIG. 28 (or FIGS. 5, 17, 15, 22) is upright with the handle generally vertically oriented, when the tip 76 of the digging tool is a horizontal edge which terminates at two spaced apart points 76A and 76B, one point 76A of which is centrally located on the head of the digging tool, and an imaginary vertical line is drawn which extends upwardly from the centrally located point 76A, the left side of the digging tool head extends to the left of the vertical line and the right side of the digging tool head extends to the right of the vertical line. The size of the left side and of the surface area of the portion of the face of the digging tool head which extends over the left side is smaller than the size of the right side and of the surface area of the portion of the face of the digging tool which extends over the right side (or vice-versa if the offset 14 is on the right side of the head instead of the left side as shown in FIG. 10).

Static Friction. The offset proximal edge of the port edge structure of the digging tools of FIGS. 1-3, 5, 7, 9 to 20, 22 to 28, 34 and 35 (1) minimizes the static friction which must be overcome to force the tip of the digging tool head into the ground or other material, and (2) increases the force per unit area which is generated at the tip of the digging tool when the digging tool head is forced into the ground (in comparison to a conventional symmetrical digging tool head of the general type illustrated in FIGS. 4 and 6 and suggested by dashed lines 36 in FIG. 3 and dashed lines 15B in FIG. 2).

Delayed Engagement and Kinetic Friction. When the head of the digging tools of FIGS. 1-3, 5, 7, 9 to 20, 22 to 28, 34 and 35 is initially pressed into the ground or other material, only the larger side of the head slides into the ground, which reduces the kinetic friction which is produced between the ground and the digging tool (in comparison to a conventional symmetrical digging tool head of the general type illustrated in FIGS. 4 and 6, suggested by dashed lines 15B in FIG. 2, and suggested by dashed lines 36 in FIG. 3).

Fulcrum. The proximal and medial edges of the digging tools of FIGS. 1-3, 5, 7, 9 to 20, 22 to 28, 34 and 35 can individually or in tandem readily function as a fulcrum, which facilitates the manipulation of the digging tool head in the ground.

Characteristics of the Proximal Edge. The proximal edge of the digging tool head of the invention:
a. Extends from the interior area of the digging tool head outwardly away from the tip of the digging tool head.
b. Can, in the embodiments of the type depicted in FIGS. 1, 3, 5 (dashed line 44C), 7 (dashed line 54B), 1 to 14, 17 to 19, 23 to 26, 29, extend from the interior area of the digging tool head upwardly toward the shoulder and away from the tip of the head.
c. Can, in the embodiments of the type depicted in FIGS. 2, 5, 7, 15, 16, 20, 22, 28, 29, 30 to 35, extend horizontally away from the medial edge.
d. Is offset along its entire length upwardly from the tip and from the lower end of the medial edge.
e. Has a ratio of the length of the lateral distance over which the proximal edge extends to the width (at the shoulder) of the digging tool head in the range of 1:1.25 to 1:6, preferably 1:1.3 to 1:4.
f. Normally does not to any significant degree extend downwardly, but rather extends horizontally or upwardly as depicted in the drawings. The proximal edge can, if desired, be canted downwardly.
g. Normally begins at or adjacent the medial edge.
h. Normally begins at or adjacent the medial edge.

Characteristics of the Medial Edge. The medial edge:
a. Extends vertically upwardly from the tip toward the handle and shoulder and into the interior area of the digging tool.
b. Has a ratio of vertical distance traversed by the medial edge to the length of the digging tool head in the range of 1:1.75 to 1:22, preferably 1:2 to 1:11, and more preferably 1:1.75 to 1:7.4.
c. Has an upper end which in many embodiments of the invention terminates at or adjacent the inner end of the proximal edge.
d. There is at least one medial edge. In FIG. 32, there are two medial edges 113, 114.

With reference to FIGS. 36-39, and also with reference to FIG. 11, an alternative digging tool 10 is provided in the form of a post hole digger 150. Like prior embodiments, the post hole digger 150 includes a handle 11 having a proximal end and a distal end which affixes to the tool's head 12. In this case, the post hole digger 150 includes two handles 11 each affixing to a head 12. Each handle 11 and head 12 are connected by a pivot assembly 151. The pivot assembly includes a pair of flanges 152 in which a flange extends laterally from the distal end of each handle 11 so as to engage and pivot relative to one another. Preferably, the respective flanges 152 are pivotally connected to one another by a bolt and nut assembly 153.

Figure 38:
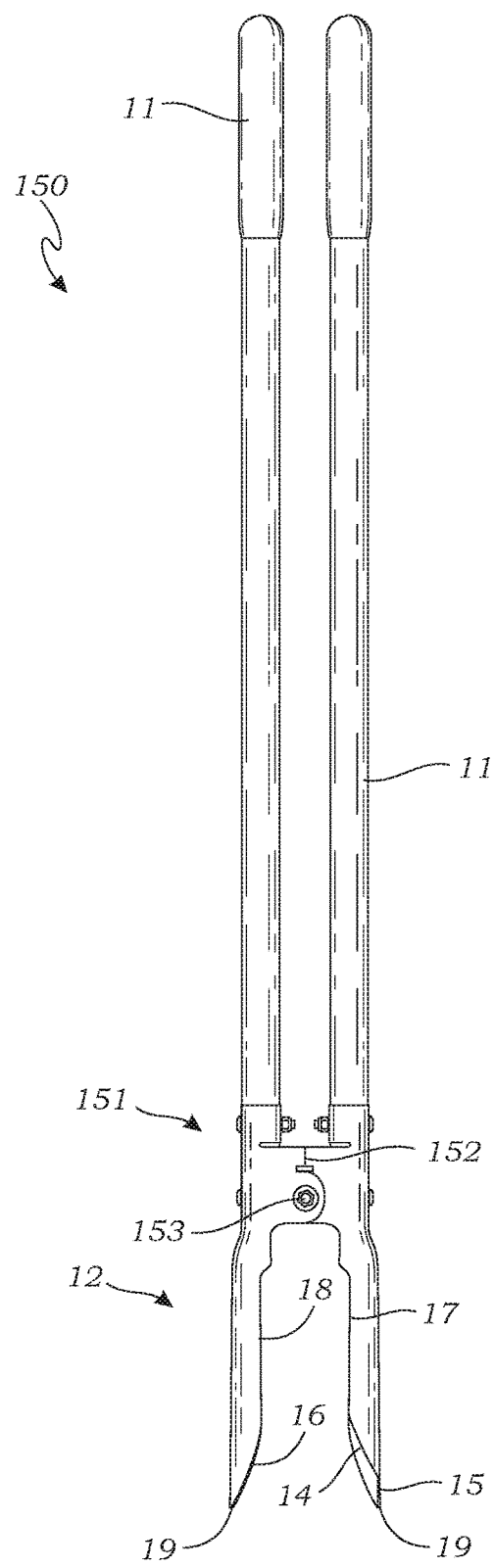
FIG. 38 is a side view of the post hole embodiment illustrated in FIG. 36.
Figure 39:
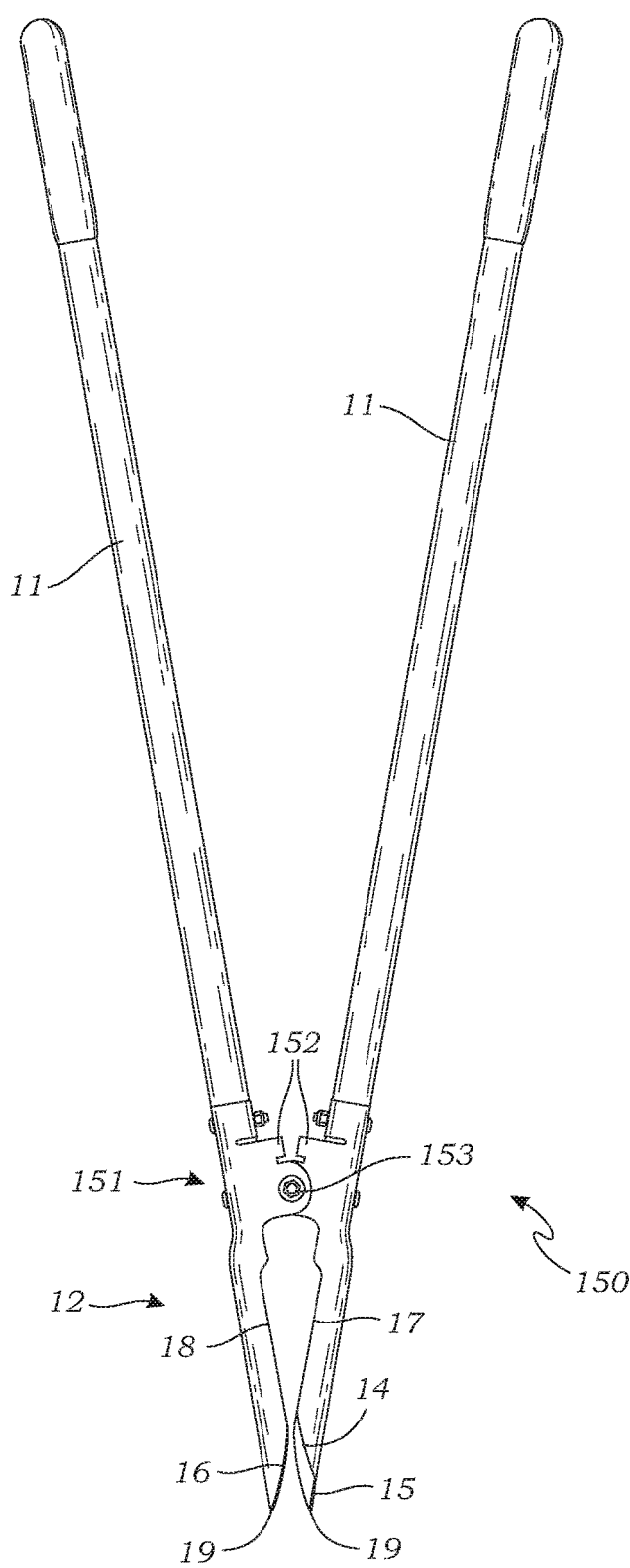
FIG. 39 is a side view of the post hole embodiment illustrated in FIG. 36 wherein the tool's handles have been forced outwardly to move the heads inwardly.

As illustrated in FIGS. 38 and 39, one can pivot each handle 11 and head 12 relative to the other such as forcing the handles 11 away from each other to correspondingly force the heads 12 towards one another, as illustrated in FIG. 39. Each head 12 of the post hold digger 150 is constructed in similar manner as the head 12 illustrated in FIG. 11. Specifically, each of the heads 12 have an upper end which connects to the distal end of the handle 11. Furthermore, each upper end has a peripheral side edge 17 and a peripheral side edge 18 which extend parallel and longitudinally from the handle 12. Moreover, each of the heads 12 have a lower end which forms the distal ground engaging edge of the head 12. The ground engaging edge includes a first convex arcuate edge 16 and a second convex arcuate edge 14. The first convex arcuate edge extends from the tool's tip 19 and extends in an arcuate convex manner to the head's side edge 18. Meanwhile, the second convex arcuate edge 14 is displaced proximately from the first convex arcuate edge 16 and it extends in a curved arcuate manner to the peripheral side edge 17. Furthermore, the tool's ground engaging edge includes a straight edge 15 which extends longitudinally from the tool's tip 19 to the second convex arcuate edge 14. Both the head's upper end and lower end collectively form the head's face 13 which has a boundary defined by the head's side edges 17 and 18, convex arcuate edges 14 and 15, and the head's straight edge 15.

Figure 40:
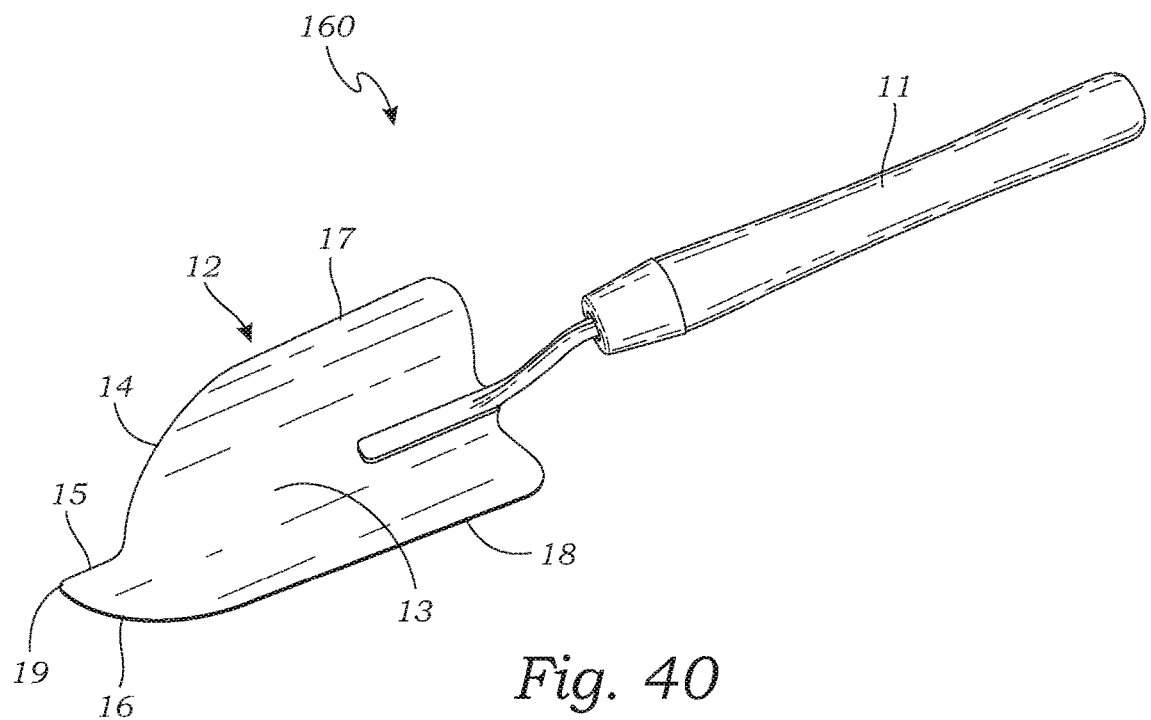
FIG. 40 is a perspective view of a hand trowel embodiment of the present invention.
Figure 41:
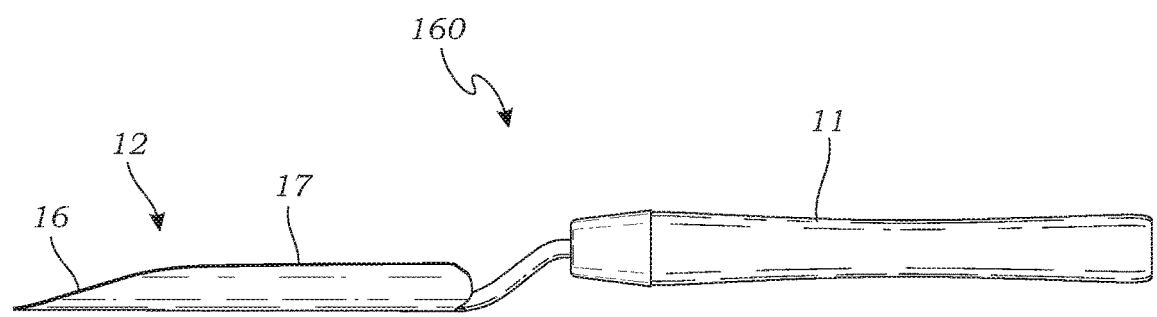
FIG. 41 is a side view of the hand trowel embodiment illustrated in FIG. 40.

In still an additional embodiment of the digging tool, a hand trowel 160 is illustrated in FIGS. 40 and 41. The hand trowel 160 also has a similar construction to the tool illustrated in FIG. 11, but the hand trowel 160 is substantially smaller for performing more controlled and minute gardening activities. To this end, the hand trowel 160 includes a shorter handle 11, still having a proximal end and a distal end that engages the tool's head 12. The tool's head has a face 13 having an upper end having side edges 17 and 18. Meanwhile, the head's lower end has a ground engaging edge including a first convex arcuate edge 16, a second convex arcuate edge 14, and a straight edge 15. Like prior embodiments such as illustrated in FIG. 11, the first convex arcuate edge 16 extends from the head's tip 19 to the side edge 18. The second convex arcuate edge 14 extends from the straight edge 15 to the side edge 17. Furthermore, the straight edge 15 extends from the head's tip 19 to the second convex arcuate edge 14. As illustrated in FIG. 11, the tool's handle 11 is substantially straight and extends along the tool's longitudinal axis. However, the tool's handle 11 also includes a short "jog" section where it bends twice so as to offset the tool's head 12 relative to the majority of the tool's handle 11.

The following examples are presented by way of illustration, and not limitation, of the invention.

EXAMPLE 1

The digging tool of FIG. 1 is utilized to gain access to a buried PVC water pipe. The digging tool is first utilized to dig down to and clear earth from the top of the water pipe so the top of the pipe is visible. The proximal edge 14 is then, with the handle of the digging tool vertically oriented, placed on the top of the pipe such that a portion of the end of the proximal edge 14 adjacent the top of the medial edge contacts the top of the pipe, such that a portion of the top of the medial edge near the proximal edge also contacts the pipe, and such that the tip 19 is pressed into the ground to one side of the pipe. The handle of the digging tool is then canted away from its vertical orientation through an angle of thirty degrees (or any other desired angle) such that the head, while the proximal and medial edges continue to contact the pipe, pivots about the pipe such that tip 19 (FIG. 10) pivots to a position beneath the pipe. The handle is then used to slide the head of the digging tool along the pipe while the medial and proximal edges continue to contact the pipe. When the head slides along the pipe in this manner, tip 19 loosens and helps removed earth that is beneath the pipe.

EXAMPLE 2

The digging tool of FIGS. 1 and 10 is utilized to remove weeds. While the handle 11 is in a substantially vertical orientation, the digging tool head is pressed into the ground such that tip 19 drives into the ground adjacent the base and root of the weed. Handle 11 is then pulled away from the weed to a canted position such that tip 19 pries the weed upwardly out of the ground.

EXAMPLE 3

The digging tool of FIGS. 1, 10, 11 is utilized. A trench is formed adjacent but spaced apart from the foundation of a home to receive a liquid which deters termites. The trench is formed by maintaining the digging tool handle 11 in a relatively upright orientation while sliding the side edge 17 against the foundation of the house and moving the tip 19 through the ground to form a trench in the ground. Since tip 19 is, while the side edge 17 slides against the foundation, spaced away from the foundation, the trench formed by tip 19 is also spaced away from the foundation. While the tip 19 and distal edge 16 slide within the ground, the digging tool head is substantially perpendicular to the foundation such that the first side edge 18 is spaced away from the foundation.

EXAMPLE 4

A small tree or shrub is being removed. The tree has a root ball. The digging tool of FIGS. 1, 10, 11 is utilized. The digging tool is driven into the ground such that tip 19 penetrates into the root ball. The handle 11 of the digging tool is then pulled downwardly away from the tree such that tip 19 rotates upwardly and functions to pry upwardly the root ball from the ground. Tip 19 often can readily penetrate a root ball whereas the rounded tip of a conventional digging tool cannot penetrate the root ball.

EXAMPLE 5

The digging tool of FIGS. 1, 10, 11 is utilized to digging tool gravel into a wheelbarrow. The point tip 19 facilitates driving the head of the digging tool into the gravel in order to lift gravel into the wheelbarrow.

EXAMPLE 6

The digging tool of FIGS. 1, 10, 11 is utilized. A building is demolished. The digging tool is employed as a pry bar. The tip 19 is pressed into a space or crevice between a pair of boards. The handle of the digging tool is pulled downwardly or upwardly such that the tip 19 pries apart the boards. A conventional digging tool typically cannot be used in this manner because the concave shape of the face of the digging tool limits the ability to drive the tip of the conventional digging tool into a narrow space between a pair of boards.

Having set forth the presently preferred embodiments of our invention in such terms as to enable those skilled in the art to make and use the invention, I Claim:

1. A dirt digging tool comprising:
   (a) at least one asymmetrical head, said at least one asymmetrical head including
      (i) an upper end having first and second peripheral side edges which are generally parallel to one another,
      (ii) a lower end spaced apart from said upper end, said lower end having a ground engaging edge,
      (iii) a face between said upper and lower ends;
   said lower end's ground engaging edge including
      (iv) a first convex arcuate peripheral edge which extends upwardly from said tip to said first peripheral side edge,
      (v) a second convex arcuate peripheral edge spaced apart from said first arcuate peripheral edge, said second convex arcuate peripheral edge having an end point spaced longitudinally apart from and positioned above said tip and below said upper end of said head, and said second convex arcuate peripheral edge extending upwardly from said end point to said second peripheral side edge, and
      (vi) a straight edge which extends from said tip upwardly to said end point said straight edge being straight and extending parallel to said upper end's first and second peripheral side edges.

2. The dirt digging tool of claim 1 further comprising an elongate handle having a proximate end, a distal end, and a longitudinal axis, said elongate handle's distal end connected to one of the at least one heads.

3. The dirt digging tool of claim 1 further comprising an elongate handle having a proximate end, a distal end, and a longitudinal axis, said elongate handle's distal end connected to one of the at least one heads; and said dirt digging tool is a hand trowel.

4. The dirt digging tool of claim 1 wherein the dirt digging tool includes two asymmetrical heads, and each of said two asymmetrical heads further comprises an elongate handle having a proximate end, a distal end, and a longitudinal axis, each of said elongate handle's distal end connected to one of said two asymmetrical heads; and said two asymmetrical heads are pivotally attached to one another to form a post hole digger.

* * * * *